(12) United States Patent
Shirahige

(10) Patent No.: US 10,303,483 B2
(45) Date of Patent: May 28, 2019

(54) ARITHMETIC PROCESSING UNIT AND CONTROL METHOD FOR ARITHMETIC PROCESSING UNIT

(71) Applicant: FUJITSU LIMITED, Kawasaki-shi, Kanagawa (JP)

(72) Inventor: Yuji Shirahige, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 15/616,171

(22) Filed: Jun. 7, 2017

(65) Prior Publication Data

US 2017/0371674 A1   Dec. 28, 2017

(30) Foreign Application Priority Data

Jun. 22, 2016 (JP) ................................. 2016-123204

(51) Int. Cl.
  *G06F 9/38* (2018.01)
  *G06F 9/30* (2018.01)
  *G06F 12/08* (2016.01)
  *G06F 9/48* (2006.01)

(52) U.S. Cl.
  CPC ........ *G06F 9/3855* (2013.01); *G06F 9/30065* (2013.01); *G06F 9/3824* (2013.01); *G06F 9/3867* (2013.01); *G06F 9/4887* (2013.01); *G06F 12/08* (2013.01)

(58) Field of Classification Search
  None
  See application file for complete search history.

(56) References Cited

U.S. PATENT DOCUMENTS

| 5,828,860 A * | 10/1998 | Miyaoku ............. G06F 9/30043 |
| | | 712/207 |
| 2006/0026366 A1 | 2/2006 | Yoshizawa et al. |
| 2010/0312968 A1 | 12/2010 | Hikichi |
| 2011/0119535 A1* | 5/2011 | Shirahige ............ G06F 11/1064 |
| | | 714/54 |

FOREIGN PATENT DOCUMENTS

| JP | 2006-040090 | 2/2006 |
| WO | WO 2009/104240 | 8/2009 |

* cited by examiner

*Primary Examiner* — Denise Tran
(74) *Attorney, Agent, or Firm* — Staas & Halsey LLP

(57) ABSTRACT

An apparatus includes: a cache to retain an instruction; an instruction-control circuit to read out the instruction from the cache; and an instruction-execution circuit to execute the instruction read out from the cache, wherein the cache includes: a pipeline processing circuit including a plurality of selection stages in each of which, among a plurality of requests for causing the cache to operate, a request having a priority level higher than priority levels of other requests is outputted to a next stage and a plurality of processing stages in each of which processing based on a request outputted from a last stage among the plurality of selection stages is sequentially executed; and a cache-control circuit to input a request received from the instruction-control circuit to the selection stage in which processing order of the processing stage is reception order of the request.

3 Claims, 15 Drawing Sheets

FIG. 5

| | CYC0 | CYC1 | CYC2 | CYC3 | CYC4 | CYC5 | CYC6 | CYC7 | CYC8 | CYC9 | CYC10 | CYC11 | CYC12 | |
|---|---|---|---|---|---|---|---|---|---|---|---|---|---|---|
| REQextA | | A | IP | | | | | | | | | | | CYCLE |
| REQextB | | | A | IP | | | | | | | | | | |
| REQVALID | | | | | | | | | | | | | | |
| WHEN THERE IS NO INTERNAL REQUEST | | | | | | | | | | | | | | |
| REQext1A | | | P1 | T | M | S | B | R | | | | | | |
| REQext1B | | | | P1 | T | M | S | B | R | | | | | |
| RSTV | | | 1 | 2 | 3 | 4 | 5 | 6 | 7 | LATENCY = 7 | | | | |
| WHEN THERE IS ONE INTERNAL REQUEST | | | | | | | | | | | | | | |
| REQintMI | P3 | P2 | P1 | T | M | S | B | R | | | | | | |
| REQext2A | | | P2 | P1 | T | M | S | B | R | | | | | |
| REQext2B | | | | P2 | P1 | T | M | S | B | R | | | | |
| RSTV | | | 1 | 2 | 3 | 4 | 5 | 6 | 7 | 8 | LATENCY = 8 | | | |

FIG. 8

DIFFERENCE BETWEEN REQextA AND REQextB IS ONE CYCLE

| | CYC0 | CYC1 | CYC2 | CYC3 | CYC4 | CYC5 | CYC6 | CYC7 | CYC8 | CYC9 | CYC10 | CYC11 | CYC12 | CYC13 | CYC14 | CYCLE |
|---|---|---|---|---|---|---|---|---|---|---|---|---|---|---|---|---|
| REQextA | | | A | IP | | | | | | | | | | | | |
| REQextB | | | | A | IP | | | | | | | | | | | |

· INPUT REQextA AS REQext1A

| REQext1A | | | | | P1 | T | M | S | B | R | | | | | | |
|---|---|---|---|---|---|---|---|---|---|---|---|---|---|---|---|---|
| REQext1B (POSSIBLE TO INPUT) | | | | | P1 | T | M | S | B | R | | | | | | |
| REQext2B (POSSIBLE TO INPUT) | | | | P2 | P1 | T | M | S | B | R | | | | | | |
| REQext3B (POSSIBLE TO INPUT) | | | | P3 | P2 | P1 | T | M | S | B | R | | | | | |
| REQext4B (POSSIBLE TO INPUT) | | | | | P3 | P2 | P1 | T | M | S | B | R | | | | |

· INPUT REQextA AS REQext4A

| REQext4A | | | | | P3 | P2 | P1 | T | M | S | B | R | | | | |
|---|---|---|---|---|---|---|---|---|---|---|---|---|---|---|---|---|
| REQext1B (IMPOSSIBLE TO INPUT) | | | | | P1 | T | M | S | B | R | | | | | | |
| REQext2B (IMPOSSIBLE TO INPUT) | | | | P2 | P1 | T | M | S | B | R | | | | | | |
| REQext3B (IMPOSSIBLE TO INPUT) | | | | P3 | P2 | P1 | T | M | S | B | R | | | | | |
| REQext4B (POSSIBLE TO INPUT) | | | | | P3 | P2 | P1 | T | M | S | B | R | | | | |

FIG. 11

| DIFFERENCE BETWEEN REQextA AND REQextB | IMMEDIATELY PRECEDING REQUEST | JUDGMENT RESULT (○: POSSIBLE TO INPUT, ×: IMPOSSIBLE TO INPUT) | | | |
|---|---|---|---|---|---|
| | | REQext1B | REQext2B | REQext3B | REQext4B |
| ONE CYCLE | REQext1A | ○ | ○ | ○ | ○ |
| | REQext2A | × | ○ | ○ | ○ |
| | REQext3A | × | × | ○ | ○ |
| | REQext4A | × | × | × | ○ |
| TWO CYCLES | REQext1A | ○ | ○ | ○ | ○ |
| | REQext2A | ○ | ○ | ○ | ○ |
| | REQext3A | × | ○ | ○ | ○ |
| | REQext4A | × | × | ○ | ○ |
| THREE CYCLES | REQext1A | ○ | ○ | ○ | ○ |
| | REQext2A | ○ | ○ | ○ | ○ |
| | REQext3A | ○ | ○ | ○ | ○ |
| | REQext4A | × | ○ | ○ | ○ |
| FOUR OR MORE CYCLES | REQext1A | ○ | ○ | ○ | ○ |
| | REQext2A | ○ | ○ | ○ | ○ |
| | REQext3A | ○ | ○ | ○ | ○ |
| | REQext4A | ○ | ○ | ○ | ○ |

FIG. 12

| STAGE WHERE REQ IS PRESENT | JUDGMENT RESULT (REQext THAT MAY NOT BE INPUTTED) |
|---|---|
| P4 | REQext4 |
| P3 | REQext3 |
| P2 | REQext2 |
| P1 | REQext1 |

| REQext THAT MAY BE INPUTTED ○: POSSIBLE TO INPUT ×: IMPOSSIBLE TO INPUT —: DON'T CARE | REQext1 | ○ | × | × | × | × |
|---|---|---|---|---|---|---|
| | REQext2 | — | ○ | × | × | × |
| | REQext3 | — | — | ○ | × | × |
| | REQext4 | — | — | — | ○ | × |
| REQext TO BE INPUTTED | | REQext1 | REQext2 | REQext3 | REQext4 | REQintRP |

ARITHMETIC PROCESSING UNIT AND CONTROL METHOD FOR ARITHMETIC PROCESSING UNIT

CROSS-REFERENCE TO RELATED APPLICATION

This application is based upon and claims the benefit of priority of the prior Japanese Patent Application No. 2016-123204, filed on Jun. 22, 2016, the entire contents of which are incorporated herein by reference.

FIELD

The embodiments discussed herein are related to an arithmetic processing unit and a control method for an arithmetic processing unit.

BACKGROUND

An arithmetic processing unit such as a central processing unit (CPU) includes a cache memory accessible at high speed compared with a main memory device (see, for example, International Publication Pamphlet No. WO 2009/104240 and Japanese Laid-open Patent Publication No. 2006-40090). The cache memory (also called a cache) is disposed between a processor core such as a CPU core and a main memory device and retains a part of information stored in the main memory device. For example, the cache memory includes a pipeline processing section that sequentially executes, in a plurality of stages, processing based on a request or the like from the processor core.

Note that, when the cache memory has a hierarchical structure, for example, the arithmetic processing unit includes a cache memory of a second level and a cache memory of a first level accessible at high speed compared with the cache memory of the second level. In the following explanation, the cache memory of the first level and the cache memory of the second level are respectively referred to as a primary cache memory and a secondary cache memory as well. Some arithmetic processing units include the primary cache memory and the like divided into an instruction cache memory for retaining instructions and a data cache memory for retaining data.

The number of stages of pipeline processing in the cache memory tends to increase according to an increase in the frequency and multi-threading of the arithmetic processing unit. According to the increase in the number of stages of the pipeline processing, a penalty (for example, latency of the pipeline processing) in the case of a stall of the pipeline processing increases.

For example, in the instruction cache memory, processing based on a request from the processor core is executed according to request order from the processor core. Therefore, when input of one request among a plurality of requests to the pipeline processing section is delayed, input of the remaining requests is sometimes delayed as well. In this case, latency from issuance of a request by the processor core until return of a result of the request to the processor core by the instruction cache memory increases. That is, it is likely that latency in the case of cache hit of the instruction cache memory increases.

SUMMARY

According to an aspect of the embodiments, an apparatus includes: a cache configured to retain an instruction; an instruction-control circuit configured to read out the instruction from the cache; and an instruction-execution circuit configured to execute the instruction read out from the cache, wherein the cache includes: a pipeline processing circuit including a plurality of selection stages in each of which, among a plurality of requests for causing the cache to operate, a request having a priority level higher than priority levels of other requests is outputted to a next stage and a plurality of processing stages in each of which processing based on a request outputted from a last stage among the plurality of selection stages is sequentially executed; and a cache-control circuit configured to input a request received from the instruction-control circuit to the selection stage in which processing order of the processing stage is reception order of the request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of the operation of the pipeline processing section illustrated in FIG. 3;

FIG. 8 is a diagram illustrating an example of order judgment by an order judging section illustrated in FIG. 4;

FIG. 11 is a diagram illustrating an example of a judgment result by the order judging section illustrated in FIG. 4;

FIG. 12 is a diagram illustrating an example of a judgment result by a collision judging section illustrated in FIG. 4;

DESCRIPTION OF EMBODIMENTS

Hereinafter, embodiments are explained with reference to the drawings.

Figure 1A:
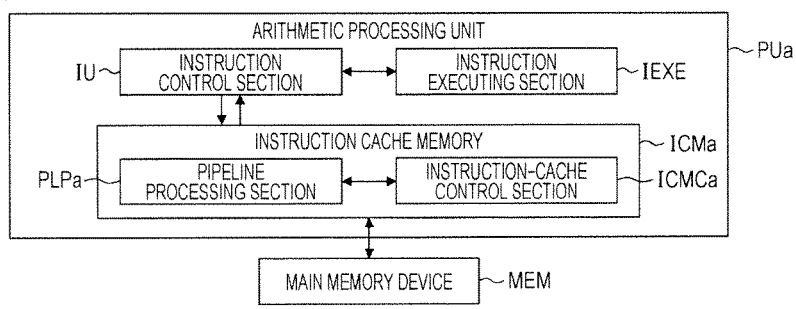
FIG. 1A is a diagram illustrating an arithmetic processing unit according to an embodiment.
Figure 1B:
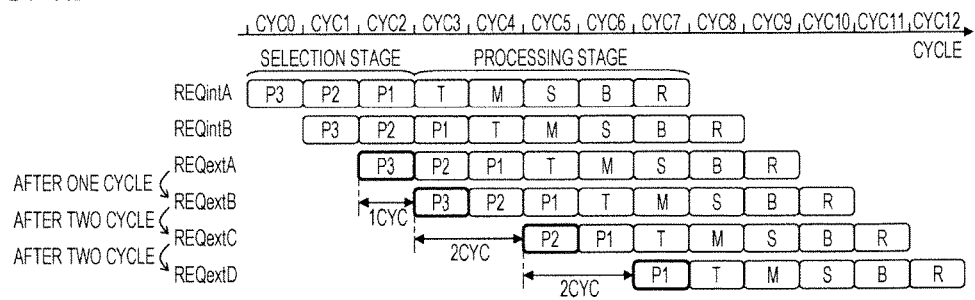
FIG. 1B is a diagram illustrating a control method for the arithmetic processing unit according to the embodiment.

FIG. 1A is a diagram illustrating an arithmetic processing unit according to an embodiment. FIG. 1B is a diagram illustrating a control method for the arithmetic processing unit according to the embodiment. An arithmetic processing unit PUa illustrated in FIG. 1A is a processor such as a CPU that executes an instruction. The arithmetic processing unit PUa includes an instruction cache memory ICMa that retains an instruction, an instruction control section IU that reads out the instruction from the instruction cache memory ICMa, and an instruction executing section IEXE that executes the instruction read out from the instruction cache memory ICMa.

The instruction cache memory ICMa is a cache memory accessible at high speed compared with a main memory device MEM and retains a part of instructions stored in the main memory device MEM.

For example, when receiving, from the instruction control section IU, a request REQ for reading out an instruction, the instruction cache memory ICMa transfers a retained instruction corresponding to an address indicated by the request REQ to the instruction control section IU. Note that, when the instruction cache memory ICMa does not retain the instruction corresponding to the address indicated by the request REQ (cash miss occurs), the instruction cache memory ICMa requests the main memory device MEM to read out the instruction.

For example, the instruction cache memory ICMa includes a pipeline processing section PLPa and an instruction-cache control section ICMCa. In FIG. 1B, an example of pipeline processing executed by the pipeline processing section PLPa, that is, an example of a control method for the arithmetic processing unit PUa is illustrated. A request REQint (REQintA, REQintB) illustrated in FIG. 1B indicates the request REQ generated on the inside of the pipeline processing section PLPa. The request REQ (REQint) generated on the inside of the pipeline processing section PLPa is hereinafter referred to as internal request REQ (REQint) as well. A request REQext (REQextA, REQextB, REQextC, and REQextD) illustrated in FIG. 1B indicates the request REQ received from the instruction control section IU. The request REQ (REQext) received from the instruction control section IU is hereinafter referred to as external request REQ (REQext) as well. For example, the internal request REQint is processed more preferentially than the external request REQext.

The pipeline processing section PLPa sequentially executes, in a plurality of stages, respective kinds of processing based on a plurality of requests REQ including the request REQext received from the instruction control section IU and the request REQint generated on the inside of the pipeline processing section PLPa. For example, in each of a plurality of selection stages P (P3, P2, and P1), among the plurality of requests REQ for causing the instruction cache memory ICMa to operate, the pipeline processing section PLPa outputs the request REQ having a priority level higher than priority levels of the other requests REQ to the next stage. That is, the pipeline processing section PLPa executes processing for selecting the request REQ having the high priority level among the plurality of requests REQ while dividing the processing into the plurality of selection stages P3, P2, and P1.

The pipeline processing section PLPa sequentially executes, in a plurality of processing stages T, M, S, B, and R, processing based on the request REQ outputted from the last stage (the selection stage P1) among the plurality of selection stages P3, P2, and P1. In this way, the pipeline processing section PLPa includes the plurality of selection stages P3, P2, and P1 and the plurality of processing stages T, M, S, B, and R. The selection stages P3, P2, and P1 and the processing stages T, M, S, B, and R are hereinafter referred to as P3 stage, P2 stage, P1 stage, T stage, M stage, S stage, B stage, and R stage as well. The processing stages T, M, S, B, and R are collectively referred to as processing stage TMSBR as well.

For example, the P3 stage is a priority stage for selecting, based on a predetermined priority level, the request REQ transferred to the P2 stage among the requests REQ input to the P3 stage. The P2 stage is a priority stage for selecting, based on a predetermined priority level, the request REQ transferred to the P1 stage among the requests REQ input to the P2 stage. The P1 stage is a priority stage for selecting, based on a predetermined priority level, the request REQ transferred to the T stage among the requests REQ input to the P1 stage.

The T stage is a stage for accessing a not-illustrated tag, a not-illustrated TLB (Translation Lookaside Buffer), and the like of the instruction cache memory ICMa. The M stage is a stage for comparing a requested address and an address registered in the tag. The S stage is a stage for selecting cache-hit data (an instruction). The B stage is a stage for storing the data selected in the S stage in a buffer. The R stage is a stage for notifying a processing result of the data or the like stored in the buffer to the instruction control section IU or the like.

In this way, in the example illustrated in FIG. 1B, the pipeline processing section PLPa executes the pipeline processing including the eight stages. Note that the number of states of the pipeline processing is not limited to the example illustrated in FIG. 1B.

The instruction-cache control section ICMCa inputs the request REQext received from the instruction control section IU to the selection stage P in which processing order of the processing stage TMSBR is reception order of the request REQ.

In the example illustrated in FIG. 1B, requests REQextA, REQextB, REQextC, and REQextD are issued from the instruction control section IU to the instruction cache memory ICMa in order. The selection stage P indicated by a thick-bordered box in FIG. 1B indicates a stage to which the requests REQ are input.

For example, the request REQextA is issued from the instruction control section IU at a cycle CYC1 and input to the instruction cache memory ICMa at the cycle CYC2. At the cycle CYC2, the requests REQintA and REQintB having priority levels higher than a priority level of the request REQextA are respectively transferred to a P1 stage and a P2 stage. Therefore, the request REQextA is inputted to the P3 stage at the cycle CYC2. In the R stage of a cycle CYC9, a result of the request REQextA is notified to the instruction control section IU. In this case, latency from the issuance of the request REQextA by the instruction control section IU until the return of the result of the request REQextA by the instruction cache memory ICMa (hereinafter referred to as latency of request REQextA as well) is nine cycles.

For example, in an instruction cache memory that inputs the request REQ received from the instruction control section IU to only the P1 stage preceding the T stage, the request REQextA collides with the request REQintA in the P1 stage. Therefore, the request REQextA is not input to the P1 stage. In this case, the request REQextA is registered in a port for re-input (not illustrated in the figure) and is re-input to a predetermined stage (for example, the P2 stage) among the selection stages P3, P2, and P1 as the internal request REQ. Latency in the case of the re-input of the request REQextA increases compared with latency in the case of input of the request REQextA to the P3 stage at the cycle CYC2 because the request REQextA is re-input through the port for re-input or the like.

The request REQextB is issued from the instruction control section IU at the cycle CYC2 one cycle after the issuance of the request REQextA and is inputted to the instruction cache memory ICMa at a cycle CYC3. In this case, when the request REQextB is inputted to the P1 stage at the cycle CYC3, processing of the request REQextB overtakes processing of the preceding request REQextA. When the request REQextB is inputted to the P2 stage at the cycle CYC3, the request REQextB and the request REQextA collide in the P2 stage. Therefore, at the cycle CYC3, the instruction-cache control section ICMCa inputs the request REQextB to the P3 stage.

The request REQextC is issued from the instruction control section IU at a cycle CYC4 two cycles after the issuance of the request REQextB and is inputted to the instruction cache memory ICMa at a cycle CYC5. In this case, when the request REQextC is inputted to the P1 stage at the cycle CYC5, the request REQextC and the request REQextB collide in the P1 stage. When the request REQextC is inputted to the P2 stage or the P3 stage at the cycle CYC5, for example, collision of the request REQextC and the request REQextB and a phenomenon in which processing of the request REQextC overtakes processing of the request REQextA do not occur.

In this case, at the cycle CYC5, the instruction-cache control section ICMCa inputs the request REQextC to, of the P2 stage and the P3 stage, the P2 stage close to the T stage. In this case, latency from the issuance of the request REQextC by the instruction control section IU until the return of the result of the request REQextC by the instruction cache memory ICMa (hereinafter referred to as latency of request REQextC as well) is eight cycles.

On the other hand, when the request REQextC is inputted to the P3 stage at the cycle CYC5, the latency of the request REQextC increases by one cycle of the P3 stage compared with when the request REQextC is inputted to the P2 stage at the cycle CYC5. In other words, in the control method illustrated in FIG. 1B, the latency of the request REQextC is able to be reduced by one cycle compared with when the request REQextC is inputted to the P3 stage at the cycle CYC5.

The request REQextD is issued from the instruction control section IU at a cycle CYC6 two cycles after the issuance of the request REQextC and is inputted to the instruction cache memory ICMa at a cycle CYC7. In this case, even if the request REQextD is inputted to any one of the selection stages P1, P2, and P3 at the cycle CYC7, for example, collision of the request REQextD and the request REQextC and a phenomenon in which processing of the request REQextD overtakes processing of the request REQextC do not occur. Therefore, at the cycle CYC7, the instruction-cache control section ICMCa inputs the request REQextC to the P1 stage (a stage preceding the T stage) closest to the T stage among the P1 stage, the P2 stage, and the P3 stage.

In this case, latency from the issuance of the request REQextD by the instruction control section IU until the return of the result of the request REQextD by the instruction cache memory ICMa (hereinafter referred to as latency of request REQextD as well) is seven cycles. On the other hand, when the request REQextD is inputted to the P3 stage at the cycle CYC7, the latency of the request REQextD increases by two cycles of the P3 stage and the P2 stage compared with when the request REQextD is inputted to the P1 stage at the cycle CYC7. In other words, in the control method illustrated in FIG. 1B, the latency of the request REQextD is able to be reduced by two cycle compared with when the request REQextD is inputted to the P3 stage at the cycle CYC7.

For example, in pipeline processing of five stages for executing the selection stages P3, P2, and P1 in one stage and executing the processing stages S and B in one stage, a processing amount of one stage increases and a cycle of one stage increases compared with the pipeline processing of the eight stages. Therefore, in an instruction cache memory operating in the pipeline processing of the five stages, speed for processing the requests REQ decreases compared with the instruction cache memory operating in the pipeline processing of the eight stages. In other words, the instruction cache memory operating in the pipeline processing of the eight stages is able to process the requests REQ at high speed compared with the instruction cache memory operating in the pipeline processing of the five stages.

Further, the instruction cache memory ICMa illustrated in FIG. 1A is able to suppress an increase in latency of the pipeline processing compared with an instruction cache memory that inputs the request REQ received from the instruction control section IU to only the P3 stage at the head of the pipeline processing. That is, it is possible to increase the speed of the instruction cache memory ICMa while suppressing an increase in the latency of the instruction cache memory ICMa. Note that the configuration of the arithmetic processing unit PUa is not limited to an example illustrated in FIG. 1A.

As explained above, in the embodiment illustrated in FIG. 1A, in the plurality of selection stages P3, P2, and P1, among the plurality of requests REQ for causing the instruction cache memory ICMa to operate to the next stage, the pipeline processing section PLPa outputs the request REQ having a priority level higher than priority levels of the other Requests. In the plurality of processing stages T, M, S, B, and R, the pipeline processing section PLPa sequentially executes processing based on the request REQ outputted from the last stage (the selection stage P1) among the plurality of selection stages P3, P2, and P1. The instruction-cache control section ICMCa inputs the request REQ received from the instruction control section IU to the selection stage P in which processing order of the processing stage TMSBR is reception order of the request REQ.

That is, the instruction-cache control section ICMCa inputs the request REQext received from the instruction control section IU to any one of the plurality of selection stages P3, P2, and P1 such that processing order of the request REQ does not become order different from the reception order. Consequently, an increase in the latency of the instruction cache memory ICMa is able to be suppressed compared with when the request REQext received from the instruction control section IU is inputted to a predetermined stage among the selection stages P3, P2, and P1.

Figure 2:
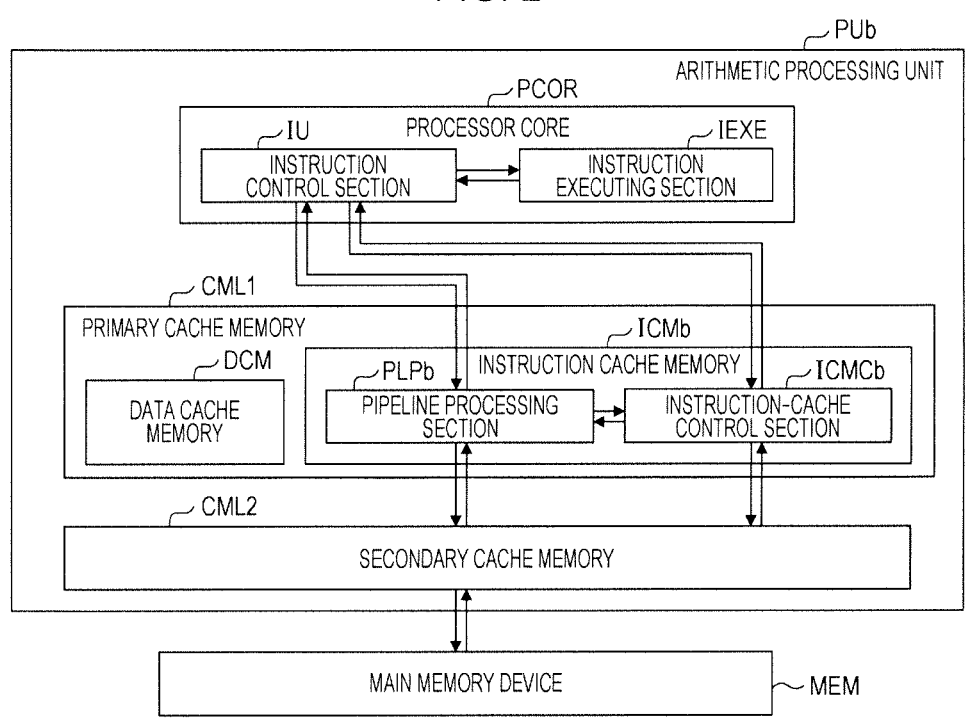
FIG. 2 is a diagram illustrating an arithmetic processing unit and a control method for the arithmetic processing unit according to another embodiment.

FIG. 2 illustrates an arithmetic processing unit and a control method for the arithmetic processing unit according to another embodiment. Components same as or similar to the components explained with reference to FIGS. 1A and 1B are denoted by the same or similar reference numerals and signs. Detailed explanation of the components is omitted. Note that, in FIG. 2, to clearly illustrate the figure, illustration of a signal line between a data cache memory DCM and a processor core PCOR, a signal line between the data cache memory DCM and a secondary cache memory CMLL, and the like is omitted. An arithmetic processing unit PUb illustrated in FIG. 2 is a processor such as a CPU that executes an instruction.

The arithmetic processing unit PUb includes the processor core PCOR, a primary cache memory CML1, a secondary cache memory CML2, and the main memory device MEM. The processor core PCOR includes the instruction control section IU and the instruction executing section IEXE. The instruction control section IU and the instruction executing section IEXE are the same as or similar to the instruction control section IU and the instruction executing section IEXE illustrated in FIG. 1A.

The primary cache memory CML1 retains a part of data and a part of instructions retained in the secondary cache memory CML2. For example, the primary cache memory CML1 includes an instruction cache memory ICMb that retains instructions executed by the instruction executing section IEXE and the data cache memory DCM that retains data used by the instruction executing section IEXE. The instruction cache memory ICMb and the data cache memory DCM are, for example, cache memories of a set associative scheme and are accessible at high speed compared with the secondary cache memory CML2.

When receiving, from the instruction control section IU, a request for reading out data, the data cache memory DCM transfers retained data corresponding to an address indicated by the request to the instruction control section IU. Note that, when the data cache memory DCM does not retain the data corresponding to the address indicated by the request (cash miss occurs), the data cache memory DCM requests the secondary cache memory CML2 to read out the data.

The instruction cache memory ICMb includes a pipeline processing section PLPb and an instruction-cache control section ICMCb instead of the pipeline processing section PLPa and the instruction-cache control section ICMCa illustrated in FIG. 1A. The other components of the instruction cache memory ICMb are the same as or similar to the components of the instruction cache memory ICMa illustrated in FIG. 1A.

For example, when receiving, from the instruction control section IU, the request REQ for reading out an instruction, the instruction cache memory ICMb transfers a retained instruction corresponding to an address indicated by the request REQ to the instruction control section IU. When the instruction cache memory ICMb does not retain the instruction corresponding to the address indicated by the request REQ (cash miss occurs), the instruction cache memory ICMb requests the secondary cache memory CML2 to read out the instruction. Details of the pipeline processing section PLPb and the instruction-cache control section ICMCb are respectively explained with reference to FIGS. 3 and 4.

The secondary cache memory CML2 is, for example, a cache memory of the set associative scheme and is accessible at high speed compared with the main memory device MEM. The secondary cache memory CML2 is connected to the primary cache memory CML1 and the main memory device MEM. For example, the secondary cache memory CML2 retains a part of data and a part of instructions stored in the main memory device MEM. When receiving, from the data cache memory DCM, a request for reading out data, the secondary cache memory CML2 transfers retained data corresponding to an address indicated by the request to the data cache memory DCM. Note that, when the secondary cache memory CML2 does not retain the data corresponding to the address indicated by the request (cash miss occurs), the secondary cache memory CML2 to requests the main memory device MEM to read out the data.

For example, when receiving, from the instruction cache memory ICMb, a request for reading out an instruction, the secondary cache memory CML2 transfers a retained instruction corresponding to an address indicated by the request to the instruction cache memory ICMb. Note that, when the secondary cache memory CML2 does not retain the instruction corresponding to the address indicated by the request (cash miss occurs), the secondary cache memory CML2 requests the main memory device MEM to read out the instruction. Note that the configuration of the arithmetic processing unit PUb is not limited to the example illustrated in FIG. 2.

Figure 3:
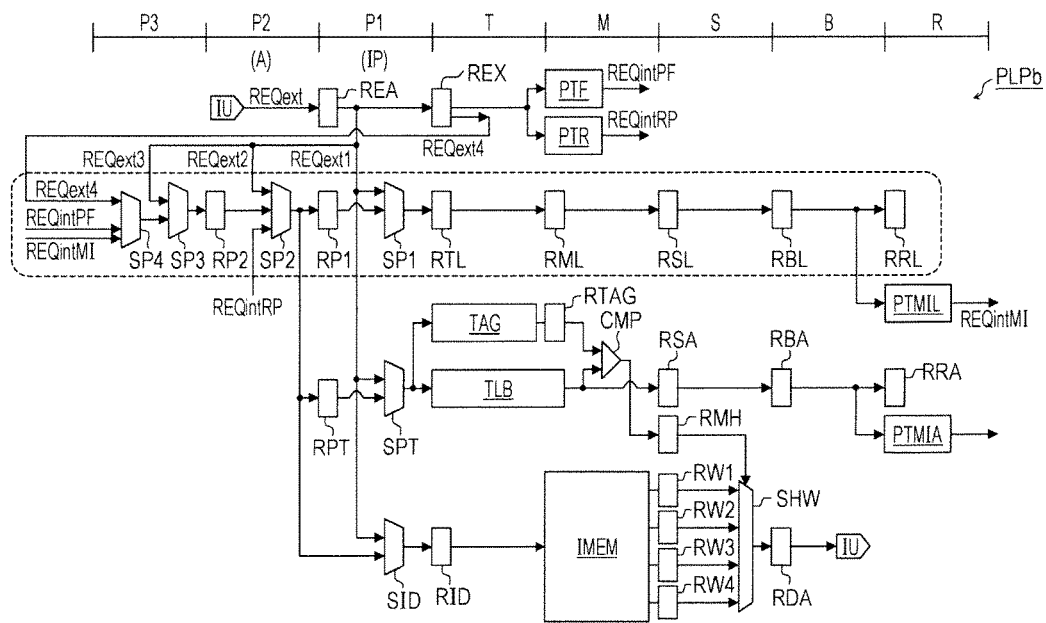
FIG. 3 is a diagram illustrating an example of a pipeline processing section illustrated in FIG. 2.

FIG. 3 illustrates an example of the pipeline processing section PLPb illustrated in FIG. 2. Note that the configuration of the pipeline processing section PLPb is not limited to the example illustrated in FIG. 3. The pipeline processing section PLPb includes the eight pipeline stages P3, P2, P1, T, M, S, B, and R explained with reference to FIG. 1B. Note that signs A and IP in parentheses illustrated in FIG. 3 indicate pipeline stages of the instruction control section IU. The stage A (hereinafter referred to as A stage as well) is a stage in which the instruction control section IU issues the request REQext. The stage IP (hereinafter referred to as IP stage as well) is a stage in which the request REQext issued in the A stage is inputted to the pipeline processing section PLPb. For example, the pipeline processing section PLPb is designed such that the IP stage and the P1 stage are the same stage.

The pipeline processing section PLPb includes registers RP2, RP1, RTL, RML, RSL, RBL, RRL, REA, REX, RPT, RTAG, RSA, RBA, RRA, RMH, RID, RW1, RW2, RW3, RW4, and RDA such as pipeline registers. For example, the register RP2 and the like output received information at the next cycle. Further, the pipeline processing section PLPb includes ports PTF, PTR, PTMIL, and PTMIA, selectors SP4, SP3, SP2, SP1, SPT, SID, and SHW, a tag, an address converting section TLB, a comparator CMP, and an instruction retaining section IMEM.

The request REQext including a logical address indicating a storage destination of an instruction transferred to the instruction control section IU and a parity bit is transferred from the instruction control section IU to the register RTL via the register REA and the like and flows through a pipeline surrounded by a broken line illustrated in FIG. 3 to be processed. When the request REQext flows from any one of the P3 stage, the P2 stage, and the P1 stage to the R stage in order, the data transfer (the transfer of the instruction) to the instruction control section IU is completed.

For example, the register REA receives the request REQext from the instruction control section IU and outputs the request REQext to the register REX and the selectors SP1, SP2, SP3, SPT, and SID at the next cycle of the reception. The request REQext outputted from the register REA to the selectors SP1, SPT, and SID is hereinafter referred to as request REQext1 as well. The request REQext outputted from the register REA to the selector SP2 is referred to as request REQext2 as well. The request REQext outputted from the register REA to the selector SP3 is referred to as request REQext3 as well.

The register REX outputs the request REQext received from the register REA to the ports PTF and PTR. Consequently, the request REQext is set in one of the ports PTF and PTR in the M stage. For example, among the requests REQext, a pre-fetch request REQext for acquiring an instruction from the secondary cache memory CML2 is set in the port PTF. The other requests REQext are set in the port PTR. Further, the register REX outputs the request REQext received from the register REA to the selector SP4 as a request REQext4.

For example, when the pre-fetch request REQext is set, the port PTF outputs an internal request REQintPF for executing pre-fetch to the selector SP4. The port PTR outputs the request REQext to the selector SP2 as an internal request REQintRP, for example, when the request REQext is not input to the pipeline from the register REA or when the request REQext input to the pipeline stalls. Consequently, the external request REQext is re-input to the pipeline as an internal request REQintRP.

The selector SP4 receives the requests REQext4, REQintPF, and REQintMI respectively from the register REX and the ports PTF and PTMIL. The selector SP4 outputs the request REQ having a high priority level among the received requests REQ to the selector SP3. For example, the request REQintMI is an internal request for executing, for example, when the instruction retaining section IMEM causes cache mistake, fill for copying the cache-missed data (instruction) from the secondary cache memory CML2 to the instruction retaining section IMEM. For example, the port PTMIL outputs the internal request REQintMI to the selector SP4 based on information received from the register RBL.

In the example illustrated in FIG. 3, a priority level of the request REQext is lower than priority levels of the requests REQintPF and REQintMI. Therefore, when receiving only the request REQext4, the selector SP4 outputs the request REQext4 to the selector SP3. Consequently, the request REQext is inputted to the P3 stage as the request REQext4. For example, when receiving the requests REQext4, REQintPF, and REQintMI, the selector SP4 outputs the request REQintMI having the highest priority level to the selector SP3.

The request REQext4 is transferred from the register REA to the selector SP4 via the register REX, the request REQext4 is inputted to the P3 stage at the next cycle of the IP stage in the pipeline processing of the instruction control section IU. Therefore, in the IP stage, the request REQext4 is inputted to the stage preceding the P3 stage. In the following explanation, for example, when input timings of the request REQext4 and the other REQext (REQext3, REQext2, and REQext1) are aligned and represented, the stage preceding the P3 stage is sometimes represented using the P4 stage or the selection stage P4.

The selector SP3 outputs, of the request REQext3 received from the register REA and the request REQ received from the selector SP4, the request REQ having a high priority level to the register RP2. A priority level of the request REQext3 is lower than a priority level of the request REQ received from the selector SP4. Therefore, when receiving only the request REQext3, the selector SP3 outputs the request REQext3 to the register RP2. That is, when the selector SP3 receives only the request REQext3, the request REQext is inputted to the P3 stage as the request REQext3 and transferred to the P2 stage. Note that, when the request REQext4 and the request REQext3 collide in the P3 stage, the request REQext4 input to the P3 stage is the request REQext issued earlier than the colliding request REQext3 as illustrated in FIG. 8.

The register RP2 outputs the request REQ received from the selector SP3 to the selector SP2. The selector SP2 outputs, among the request REQext2 received from the register REA, the request REQ received from the register RP2, and the request REQintRP received from the port PTR, the request REQ having a high priority level to the register RP1 and RPT and the selector SID. A priority level of the request REQext2 is lower than priority levels of the request REQintRP and the request REQ received from the register RP2. When receiving only the request REQext2, the selector SP2 outputs the request REQext2 to the register RP1. That is, when the selector SP2 receives only the request REQext2, the request REQext is inputted to the P2 stage as the request REQext2 and transferred to the P1 stage.

The register RP1 outputs the request REQ received from the selector SP2 to the selector SP1. The selector SP1 outputs, of the request REQext1 received from the register REA and the request REQ received from the register RP1, the request REQ having a high priority level to the register RTL. A priority level of the request REQext1 is lower than a priority level of the request REQ received from the register RP1. Therefore, when receiving only the request REQext1, the selector SP1 outputs the request REQext1 to the register RTL. That is, when the selector SP1 receives only the request REQext1, the request REQext is inputted to the P1 stage as the request REQext1 and transferred to the T stage.

In this way, in the IP stage in the pipeline processing of the instruction control section IU, the request REQext is inputted to any one of the P3 stage, the P2 stage, and the P1 stage of the pipeline processing section PLPb. Alternatively, the request REQext is inputted to the P3 stage of the pipeline processing PLPb at the next cycle of the IP stage in the pipeline processing of the instruction control section IU. Note that the request REQext is not input to the pipeline as the external request REQext (REQext1, REQext2, REQext3, and REQext4), the request REQext is inputted to the P2 stage as the internal request REQintRP.

The request REQ transferred to the register RTL is sequentially transferred to the registers RML, RSL, RBL, and RRL. That is, the request REQ transferred to the register RTL flows from the T stage to the R stage in order.

The register RPT outputs the request REQ received from the selector SP2 to the selector SPT. The selector SPT selects one of the request REQext1 received from the register REA and the request REQ received from the register RPT and outputs the selected request REQ to the tag TAG and the address converting section TLB.

The tag TAG retains, for each of index addresses, information including tag addresses of instructions retained in ways of the instruction retaining section IMEM. The index address is an address represented by a bit group of a portion of a logical address indicating a stage destination of an instruction. The tag address is a physical address corresponding to an address represented by a bit group of another portion of the logical address. The tag TAG outputs, for each of the ways of the instruction retaining section IMEM, a tag address corresponding to an index address indicated by the request REQ received from the selector SPT to the comparator CMP via the register RTAG.

The address converting section TLB converts a logical address indicated by the request REQ received from the selector SPT into a physical address and outputs the converted physical address to the register RSA. The address converting section TLB outputs a tag address in the physical address to the comparator CMP.

The comparator CMP compares the tag addresses of the ways of the instruction retaining section IMEM received from the tag TAG and the tag address received from the address converting section TLB. When any one of the tag addresses received for each of the ways of the instruction retaining section IMEM from the tag TAG and the tag address received from the address converting section TLB coincide with each other, the comparator CMP outputs information indicating the way in which the tag addresses coincide to the register RMH. That is, the comparator CMP outputs information indicating the cache-hit way to the register RMH. Note that, when none of the tag addresses received for each of the ways of the instruction retaining section IMEM from the tag TAG coincides with the tag address received from the address converting section TLB, the comparator CMP outputs information indicating occurrence of cash miss to the register RMH.

The register RMH outputs the information received from the comparator CMP to the selector SHW. The register RSA outputs the information such as the physical address received from the address converting section TLB to the register RRA and the port PTMIA via the register RBA. The port PTMIA outputs information used as a set together with the internal request REQintMI.

The selector SID selects one of the request REQext1 received from the register REA and the request REQ received from the selector SP2 and outputs the information such as the index address indicated by the selected request REQ to the instruction retaining section IMEM via the register RID.

The instruction retaining section IMEM includes, for example, four ways. Note that the number of ways is not limited to four. The instruction retaining section IMEM outputs, among the instructions stored in the ways, an instruction corresponding to the index address received from the selector SID to the selector SHW via the register RW (RW1, RW2, RW3, and RW4) for each of the ways.

The selector SHW outputs, among the instructions received from the registers RW1, RW2, RW3, and RW4 (the instructions outputted from the four ways), an instruction corresponding to the way indicated by the information received from the register RMH to the instruction control section IU via the register RDA. Consequently, the data transfer (the transfer of the instruction) to the instruction control section IU is completed. Note that, when the information received from the register RMH indicates cache miss, the selector SHW outputs none of the instructions received from the registers RW1, RW2, RW3, and RW4 to the instruction control section IU.

Figure 4:
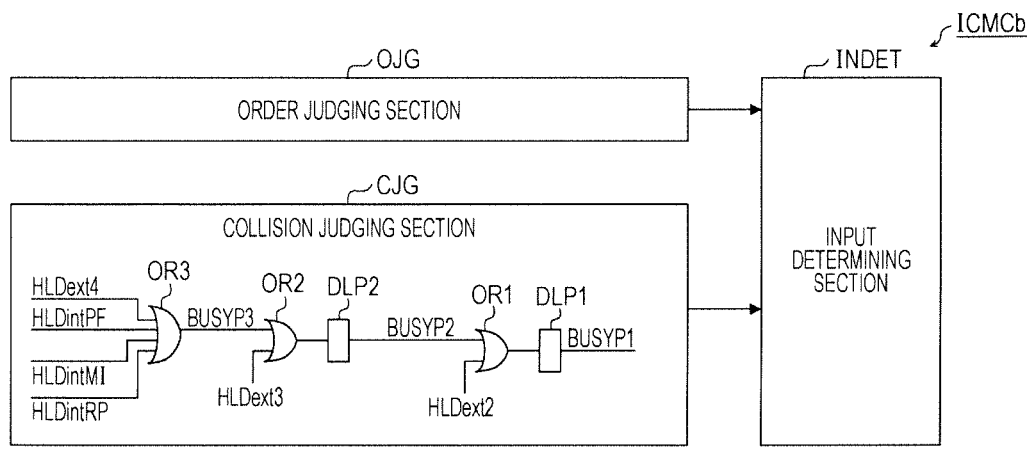
FIG. 4 is a diagram illustrating an example of an instruction-cache control section illustrated in FIG. 2.

FIG. 4 illustrates an example of the instruction-cache control section ICMCb illustrated in FIG. 2. The instruction-cache control section ICMCb includes an order judging section OJG (hereinafter referred to as judging section OJG as well), a collision judging section CJG (hereinafter referred to as judging section CJG as well), and an input determining section INDET.

The order judging section OJG judges whether the request REQext overtakes processing of the already-inputted request REQ, for example, when the request REQext is input as the requests REQext1, REQext2, REQext3, and REQext4. That is, the order judging section OJG specifies the selection stage P in which processing order of the processing stage TMSBR is reception order of the request REQ among the selection stages P4, P3, P2, and P1, which are candidates of an input destination of the request REQext received from the instruction control section IU.

The collision judging section CJG judges whether the request REQext collides with the already-inputted request REQ, for example, when the request REQext is input as the requests REQext1, REQext2, REQext3, and REQext4. That is, the collision judging section CJG specifies the selection stage P in which the collision of the request REQext1 and the already-inputted request REQ is avoided among the selection stages P4, P3, P2, and P1, which are the candidates of the input destination of the request REQext received from the instruction control section IU.

For example, the collision judging section CJG includes OR circuits OR1, OR2, and OR3 and registers DLP1 and DLP2.

The OR circuit OR3 calculates OR of a signal HLDext4, a signal HLDintPF, a signal HLDintMI, and a signal HLDintRP and outputs a calculation result to the OR circuit OR2 and the input determining section INDET as a signal BUSYP3.

For example, the signal HLDext4 is information indicating that the request REQext4 (the already-inputted external request REQext) is transferred to the P3 stage. The signal HLDext4 is set to a logical value "1" when the request REQext4 is present in the P3 stage. The signal HLDintPF is information indicating that the request REQintPF is inputted to the P3 stage. The signal HLDintPF is set to the logical value "1" when the request REQintPF is present in the P3 stage. The signal HLDintMI is information indicating that the request REQintMI is inputted to the P3 stage. The signal HLDintMI is set to the logical value "1" when the request REQintMI is present in the P3 stage. The signal HLDintRP is a signal for emptying the P2 stage in order to input the request REQintRP to the P2 stage.

Therefore, the signal BUSYP3 having the logical value "1" indicates that any one of the requests REQext4, REQintPF, and REQintMI is present in the P3 stage. The signal BUSYP3 having a logical value "0" indicates that none of the request REQext4, REQintPF, and REQintMI is present in the P3 stage. That is, the signal BUSYP3 is an example of third collision information indicating that the request REQ is present in the P3 stage.

The OR circuit OR2 calculates OR of a signal HLDext3 and the signal BUSYP3 and outputs a calculation result to the register DLP2. For example, the signal HLDext3 is information indicating that the request REQext3 is inputted to the P3 stage. The signal HLDext3 is set to the logical value "1" when the request REQext3 is present in the P3 stage. That is, when an output signal of the OR circuit OR2 has the logical value "1", this indicates that the request REQ is present in the P3 stage. When the output signal of the OR circuit OR2 has the logical value "0", this indicates that the request REQ is absent in the P3 stage.

The register DLP2 outputs information received from the OR circuit OR2 to the OR circuit OR1 at the next cycle of the reception. That is, the register DLP2 is an example of a second delay section that outputs the information received from the OR circuit OR2 with a delay of one stage. When an output signal BUSYP2 of the register DLP2 has the logical value "1", this indicates that any one of the requests REQext4, REQext3, REQintPF, REQintMI, and REQintRP is present in the P2 stage. When the output signal BUSYP2 of the register DLP2 has a logical value "0", this indicates that none of the requests REQext4, REQext3, REQintPF, REQintMI, and REQintRP is present in the P2 stage.

That is, the signal BUSYP2 is an example of second collision information indicating that the request REQ is present in the P2 stage.

The OR circuit OR1 calculates OR of a signal HLDext2 and the signal BUSYP2 and outputs a calculation result to the register DLP1. For example, the signal HLDext2 is information indicating that the request REQext2 is inputted to the P2 stage. The signal HLDext2 is set to the logical value "1" when the request REQext2 is present in the P2 stage. That is, when an output signal of the OR circuit OR1 has the logical value "1", this indicates that any one of the requests REQext4, REQext3, REQext2, REQintPF, REQintMI, and REQintRP is present in the P2 stage. When the output signal of the OR circuit OR1 has the logical value "0", this indicates that none of the requests REQext4, REQext3, REQext2, REQintPF, REQintMI, and REQintRP is present in the P2 stage.

The register DLP1 outputs information received from the OR circuit OR1 to the input determining section INDET as a signal BUSYP1 at the next cycle of the reception. The signal BUSYP1 is an example of first collision information indicating that the request REQ is present in the P1 stage. That is, the register DLP1 is an example of a first delay section that outputs the information received from the OR circuit OR1 to the input determining section INDET with a delay of one stage as the first collision information indicating that the request REQ is present in the P1 stage.

The signal BUSYP1 having the logical value "1" indicates that any one of the requests REQext4, REQext3, REQext2, REQintPF, REQintMI, and REQintRP is present in the P1 stage. The signal BUSYP1 having the logical value "0" indicates that none of the requests REQext4, REQext3, REQext2, REQintPF, REQintMI, and REQintRP is present in the P1 stage.

The input determining section INDET determines, based on a judgment result of the order judging section OJG and a judgment result of the collision judging section CJG, the selection stage P serving as an input destination of the request REQext received by the instruction cache memory ICMb from the instruction control section IU. For example, the input determining section INDET specifies, based on the respective judgment results of the judging sections OJG and CJG, the selection stages P in which collision of the judgment target request REQext and the already-inputted request REQ is avoided and processing order of the processing stage TMSBR is reception order of the request REQ. The input determining section INDET determines, among the specified stages P, the selection state P closest to the processing stage TMSBR as a stage at an input destination of the request REQext received from the instruction control section IU. For example, the input determining section INDET controls the selector SP1 to SP4 illustrated in FIG. 3 and inputs the external request REQext to the selection stage P closest to the processing stage TMSBR among the selection stages P specified by both of the order judging section OJG and the collision judging section CJG.

FIG. 5 illustrates an example of the operation of the pipeline processing section PLPb illustrated in FIG. 3. Note that FIG. 5 illustrates an example of the operation of the pipeline processing section PLPb performed when the internal request REQint is absent and when one internal request REQint is present.

In the example illustrated in FIG. 5, the request REQextB is issued at the cycle CYC2 next to the cycle CYC1 at which the request REQextA is issued. A signal REQVALID is a signal indicating that the request REQext is issued. The signal REQVALID is outputted from the instruction control section IU to the instruction cache memory ICMb. For example, at the cycles CYC1 and CYC2 at which the requests REQextA and REQextB are issued, the signal REQVALID having the logical value "1" is outputted from the instruction control section IU to the instruction cache memory ICMb. A signal RSTV is a signal indicating that processing of the request REQext is completed. The signal RSTV is outputted from the instruction cache memory ICMb to the instruction control section IU. For example, in the R stage, the signal RSTV having the logical value "1" is outputted from the instruction cache memory ICMb to the instruction control section IU.

When the internal request REQint is absent, at the cycle CYC2, the request REQextA is inputted to the P1 stage as a request REQext1A. The request REQext1A flows from the P1 stage to the T stage, the M stage, the S stage, the B stage, and the R stage in this order to be processed. The request REQextB is inputted to the P1 stage as a request REQext1B at the cycle CYC3. The request REQext1B flows from the P1 stage to the R stage. In this case, latency from the issuance of the request REQextA by the instruction control section IU until completion of the processing of the request REQextA is seven cycles. Similarly, latency of the request REQextB is seven cycles.

When one internal request REQint is present, in the example illustrated in FIG. 5, the request REQext is inputted to the P1 stage at the cycle CYC3 one cycle late compared with when the internal request REQint is absent. For example, at a cycle CYC0, the internal request REQintMI is inputted to the P3 stage. Therefore, at the cycle CYC2, when the request REQextA is inputted to the P1 stage as the request REQext1A, the request REQext1A collides with the request REQintMI. A priority level of the request REQext1A is lower than a priority level of the request REQintMI. Therefore, the request REQext1A is not input to the P1 stage. Therefore, at the cycle CYC2, the request REQextA is inputted to the P2 stage as a request REQext2A. The request REQext2A flows from the P2 stage to the R stage.

In this case, at the cycle CYC3, when the request REQextB is inputted to the P1 stage as the request REQext1B, the request REQext1B collides with the request REQext2A. A priority level of the request REQext1B is lower than a priority level of the request REQext2A transferred from the P2 stage to the P1 stage. Therefore, the request REQext1B is not input to the P1 stage. Therefore, at the cycle CYC3, the request REQextB is inputted to the P2 stage as a request REQext2B. The request REQext2B flows from the P2 stage to the R stage.

In this way, when one internal request REQint is present, the latency of the requests REQextA and REQextB increases by one cycle of the P2 stage compared with the internal request REQint is absent and increases to eight cycles.

Figure 6:
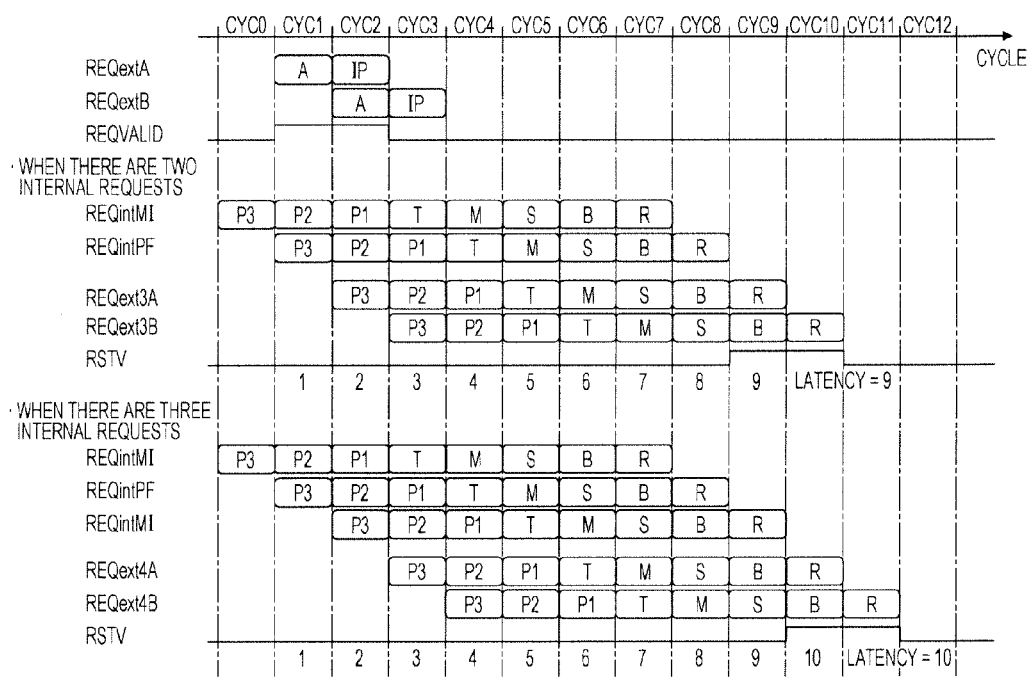
FIG. 6 is a diagram illustrating another example of the operation of the pipeline processing section illustrated in FIG. 3.

FIG. 6 illustrates another example of the operation of the pipeline processing section PLPb illustrated in FIG. 3. Note that FIG. 6 illustrates an example of the operation of the pipeline processing section PLPb performed when two internal requests REQint are present and when three internal request REQint are present. Issuance timing and the like of the requests REQextA and REQextB illustrated in FIG. 6 are the same as those of the requests REQextA and REQextB illustrated in FIG. 5.

When two internal requests REQint are present, in the example illustrated in FIG. 6, the request REQextA is inputted to the P1 stage at the cycle CYC4 two cycles late compared with when the internal request REQint is absent as illustrated in FIG. 5. For example, at the cycle CYC0, the internal request REQintMI is inputted to the P3 stage. At the cycle CYC1, the internal request REQintPF is inputted to the P3 stage. Therefore, at the cycle CYC2, when the request REQextA is inputted to the P2 stage as the request REQext2A, the request REQext2A collides with the request REQintPF. A priority level of the request REQext2A is lower than a priority level of the request REQintPF. Therefore, the request REQext2A is not input to the P2 stage. Therefore, at the cycle CYC2, the request REQextA is inputted to the P3 stage as a request REQext3A. The request REQext3A flows from the P3 stage to the R stage.

In this case, at the cycle CYC3, when the request REQextB is inputted to the P1 stage as the request REQext1B, the request REQext1B overtakes the request REQext3A. At the cycle CYC3, when the request REQextB is inputted to the P2 stage as the request REQext2B, the request REQext2B collides with the request REQext3A transferred to the P2 stage. Therefore, at the cycle CYC3, the request REQextB is inputted to the P3 stage as a request REQext3B. The request REQext3B flows from the P3 stage to the R stage.

In this way, when the two internal requests REQint are present, the latency of the requests REQextA and REQextB increases by two cycles compared with when the internal request REQint is absent and increases to nine cycles.

When three internal requests REQint are present, in the example illustrated in FIG. 6, the request REQextA is inputted to the P1 stage at the cycle CYC5 three cycles late compared with when the internal request REQint is absent. For example, at the cycle CYC0, a first internal request REQintMI is inputted to the P3 stage. At the cycle CYC1, the internal request REQintPF is inputted to the P3 stage. At the cycle CYC2, a second internal request REQintMI is inputted to the P3 stage. Therefore, at the cycle CYC2, when the request REQextA is inputted to the P3 stage as the request REQext3A, the request REQext3A collides with the second request REQintMI. A priority level of the request REQext3A is lower than a priority level of the request REQintMI. Therefore, the request REQext3A is not input to the P3 stage. Therefore, at the cycle CYC3 next to the cycle CYC2, the request REQextA is inputted to the P2 stage as a request REQext4A. The request REQext4A flows from the P3 stage to the R stage.

Because of a reason same as the reason in the case of the two internal requests REQint, the request REQextB is inputted to the P3 stage as a request REQext4B at the cycle CYC4 next to the cycle CYC3 at which the request REQext4A is inputted to the P3 stage. The request REQext4 flows from the P3 stage to the R stage.

In this way, when the three internal requests REQint are present, the latency of the requests REQextA and REQextB increases by three cycles compared with when the internal request REQint is absent and increases to ten cycles.

Note that, although not illustrated in the figure, when four internal requests REQint are present, at the cycle CYC3, when the request REQextA is inputted to the P3 stage as the request REQext4A, the request REQext4A collides with a fourth internal request REQint. In this case, the request REQextA is set in the port PTR and input to the P2 stage as the internal request REQintRP.

As illustrated in FIGS. 5 and 6, in the pipeline processing section PLPb, when the external request REQext and the internal request REQint collide, input timing of the external request REQext is able to be delayed in units of one cycle.

Figure 7A:
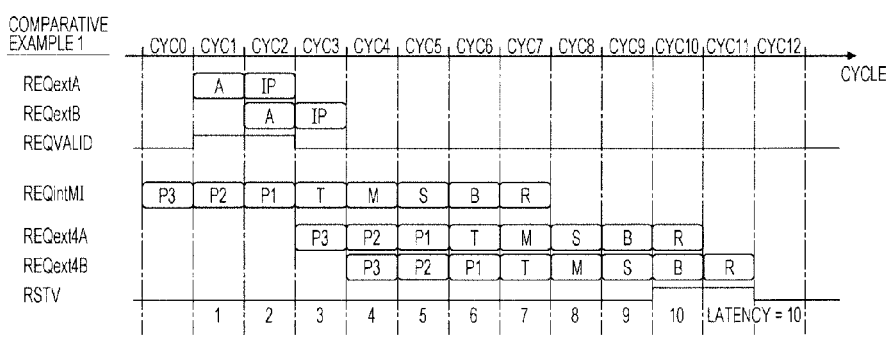
FIGS. 7A and 7B are diagrams illustrating comparative examples of the operation of the pipeline processing section illustrated in FIG. 3.
Figure 7B:
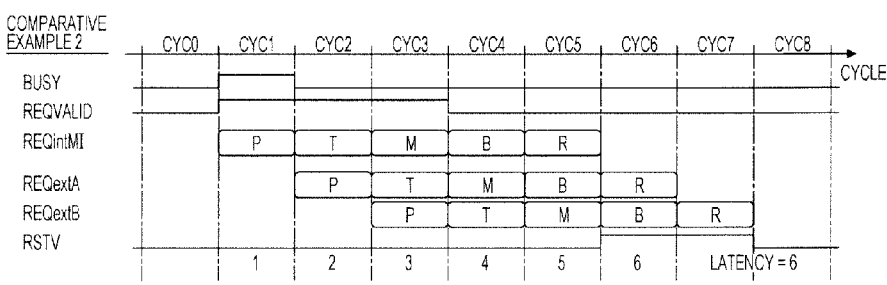

FIGS. 7A and 7B illustrate comparative examples of the operation of the pipeline processing section PLPb illustrated in FIG. 3. Note that FIGS. 7A and 7B illustrate comparative examples of the operation of the pipeline processing section PLPb performed when one internal request REQint is present. First, a comparative example 1 illustrated in FIG. 7A is explained.

The comparative example 1 indicates the operation of a pipeline processing section in which method for inputting the requests REQext2 and REQext3 to a pipeline is absent. For example, the operation of the comparative example 1 corresponds to the operation of a pipeline processing section in which the selector SP3 illustrated in FIG. 3 is omitted from the pipeline processing section PLPb and a selector that selects one of an output of the register RP2 and the request REQintRP is provided instead of the selector SP2.

In the comparative example 1, when one internal request REQint is present, the request REQextA is inputted to the P1 stage at the cycle CYC5 three cycles late compared with when the internal request REQint is absent as illustrated in FIG. 5. For example, at the cycle CYC2, when the request REQext1A is inputted to the P1 stage, the request REQext1A collides with the request REQintMI. A priority level of the request REQext1A is lower than a priority level of the request REQintMI. Therefore, the request REQext1A is not input to the P1 stage. In the comparative example 1, method for inputting the requests REQext2 and REQext3 to the pipeline is absent. Therefore, when the request REQext1A is not able to be inputted to the P1 stage, at the cycle CYC3, a request REQext4A is inputted to the P3 stage. The request REQext4A flows from the P3 stage to the R stage.

In this way, in the comparative example 1, even when only one internal request REQint is present, the request REQextA is inputted to the P1 stage at the cycle CYC5 three cycles late compared with when the internal request REQint is absent. Therefore, the latency of the requests REQextA and REQextB increases by three cycles of the P4 stage, the P3 stage, and the P2 stage compared with when the internal request REQint is absent as illustrated in FIG. 5. That is, in the comparative example 1, even when only one internal request REQint is present, the latency of the requests REQextA and REQextB increases by three cycles compared with when the internal request REQint is absent as illustrated in FIG. 5 and increases to ten cycles.

On the other hand, in the pipeline processing section PLPb illustrated in FIG. 3, as explained with reference to FIG. 5, when one internal request REQint is present, the latency of the requests REQextA and REQextB is eight cycles. That is, the pipeline processing section PLPb is able to reduce the latency of the request REQext by two cycles compared with the comparative example 1. A comparative example 2 illustrated in FIG. 7B is explained.

The comparative example 2 indicates the operation of a pipeline processing section that operates at a low frequency compared with the comparative example 1. For example, in the comparative example 2, the processing in the P3 stage, the P2 stage, and the P1 stage is executed in one P stage and the processing in the S stage and the B stage is executed in one B stage. That is, in the comparative example 2, pipeline processing including five stages is executed. In the comparative example 2, the processing in the A stage and the IP stage in the pipeline processing of the instruction control section is executed in one A stage. The A stage and the P stage are designed to be the same stage. Therefore, in the comparative example 2, the instruction cache memory avoids collision of the internal request REQint and the external request REQext by outputting, to the instruction control section, a signal BUSY indicating that the request REQ from the instruction control section is not received.

In the comparative example 2, the instruction control section receives the signal BUSY having the logical value "1" at the cycle CYC1 at which the internal request REQintMI is inputted to the P stage. Therefore, the instruction control section continues to output the same request REQextA until the signal BUSY has a logical value "0". At the cycle CYC2 at which the signal BUSY has the logical value "0", the instruction cache memory receives the request REQextA from the instruction control section and inputs the request REQextA to the P stage. Consequently, the request REQextA flows from the P stage to the R stage. In this case, the latency of the request REQextA increases by one cycle compared with when the internal request REQint is absent. In this way, in the comparative example 2, when the external request REQext and the internal request REQint collide, input timing of the external request REQext is able to be delayed in units of one cycle using the signal BUSY.

Note that, in the pipeline processing section PLPb illustrated in the comparative example 1 and FIG. 3, the IP stage and the P1 stage are designed to be the same stage. Therefore, it is difficult to execute control using the signal BUSY. Therefore, the pipeline processing section PLPb inputs the request REQext received from the instruction control section IU to any one of the selection stages P1, P2, and P3 using the requests REQext1, REQext2, REQext3, and REQext4. Consequently, in the pipeline processing section PLPb in which the frequency of the pipeline processing is increased compared with the comparative example 2, when the external request REQext and the internal request REQint collide, the input timing of the external request REQext is able to be delayed in units of one cycle. As a result, an increase in the latency of the request REQext is able to be suppressed compared with the comparative example 1.

FIG. 8 illustrates an example of order judgment by the order judging section OJG illustrated in FIG. 4. Note that FIG. 8 illustrates an example of order judgment when a difference between issuance timings of the request REQextA and the request REQextB issued after the request REQextA is one cycle. In FIG. 8, the P1 stage is indicated by hatching in order to facilitate viewing of processing order of the requests REQext.

When the request REQextA is input as the request REQext1A, the request REQext1A is inputted to the P1 stage at the cycle CYC2. In this case, at the cycle CYC3, even if the request REQextB is inputted to the P1 stage as the request REQext1B, the request REQext1B does not overtake the preceding request REQext1A. Therefore, the order judging section OJG judges that it is possible to input the request REQextB to the P1 stage as the request REQext1B. Therefore, the order judging section OJG judges that it is also possible to input the requests REQext2B, REQext3B, and REQext4B, timings of transfer to the P1 stages of which are later than the transfer timing of the request REQext1B.

When the request REQextA is input as the request REQext4A, the request REQext4A is inputted to the P3 stage at the cycle CYC3 and transferred to the P1 stage at the cycle CYC5. In this case, at the cycle CYC3, when the request REQextB is inputted to the P1 stage as the request REQext1B, the request REQext1B overtakes the preceding request REQext1A. At the cycle CYC3, when the request REQextB is inputted to the P2 stage as the request REQext2B, the request REQext2B overtakes the preceding request REQext1A. Alternatively, at the cycle CYC3, when the request REQextB is inputted to the P3 stage as the request REQext3B, the request REQext3B collides with the preceding request REQext1A. Therefore, the order judging section OJG judges that it is impossible to input the requests REQext1B, REQext2B, and REQext3B.

Note that, at the cycle CYC4, when the request REQextB is inputted to the P3 stage as the request REQext4B, the request REQext4B does not overtake the preceding request REQext4A. Therefore, the order judging section OJG judges that it is possible to input the request REQextB to the P3 stage as the request REQext4B.

Although not illustrated in the figure, when the request REQextA is input as the request REQext2A, the request REQext2A is transferred to the P1 stage at the cycle CYC3 next to the cycle CYC2 at which the request REQext1A is inputted to the P1 stage. Therefore, at the cycle CYC3, when the request REQextB is inputted to the P1 stage as the request REQext1B, the request REQext1B collides with the preceding request REQext2A. In this case, the order judging section OJG judges that it is impossible to input the request REQext1B and judges that it is possible to input the requests REQext2B, REQext3B, and REQext4B. When the request REQextA is input as the request REQext3A, the request REQext3A is transferred to the P1 stage at the cycle CYC4 after next to the cycle CYC2 at which the request REQext1A is inputted to the P1 stage. Therefore, at the cycle CYC3, when the request REQextB is inputted to the P2 stage as the request REQext2B, the request REQext2B collides with the preceding request REQext3A. In this case, the order judging section OJG judges that it is impossible to input the requests REQext1B and REQext2B and judges that it is possible to input the requests REQext3B and the REQext4B.

Figure 9:
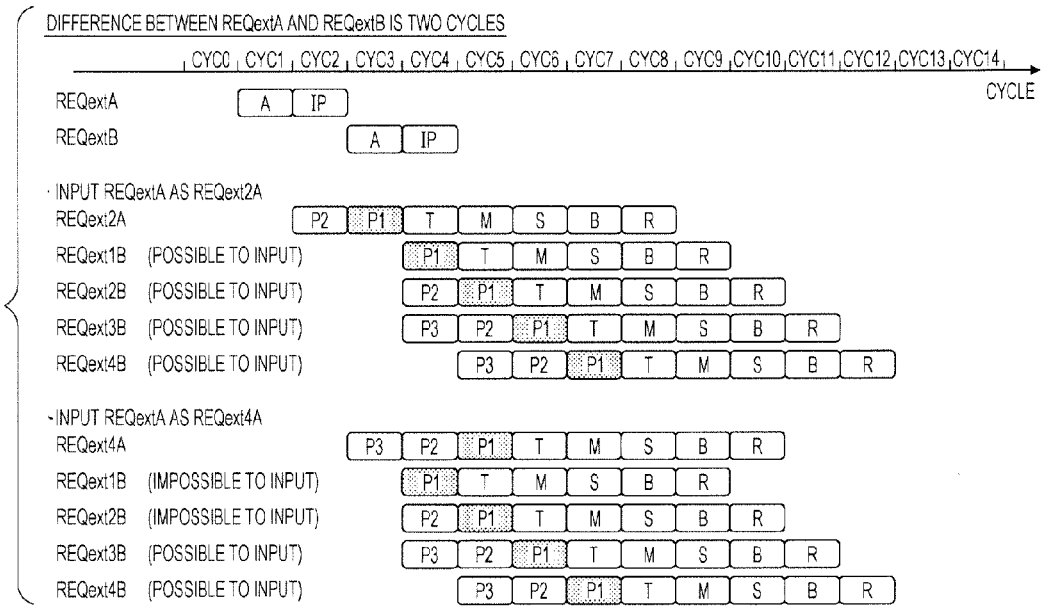
FIG. 9 is a diagram illustrating another example of the order judgment by the order judging section illustrated in FIG. 4.

FIG. 9 illustrates another example of the order judgment by the order judging section OJG illustrated in FIG. 4. Note that FIG. 9 illustrates an example of order judgment performed when a difference between issuance timings of the request REQextA and the request REQextB issued after the request REQextA is two cycles. In FIG. 9, as in FIG. 8, the P1 stage is indicated by hatching.

When the request REQextA is input as the request REQext2A, the request REQext2A is inputted to the P2 stage at the cycle CYC2 and transferred to the cycle CYC3 to the P1 stage. In this case, at the cycle CYC4, even if the request REQextB is inputted to the P1 stage as the request REQext1B, the request REQext1B does not overtake the preceding request REQext2A. Therefore, the order judging section OJG judges that it is possible to input the request REQextB to the P1 stage as the request REQext1B. Therefore, the order judging section OJG judges that it is also possible to input the requests REQext2B, REQext3B, and REQext4B, timings of transfer to the P1 stages of which are later than the transfer timing of the request REQext1B.

When the request REQextA is input as the request REQext4A, the request REQext4A is inputted to the P3 stage at the cycle CYC3 and transferred to the P1 stage at the cycle CYC5. In this case, at the cycle CYC4, when the request REQextB is inputted to the P1 stage as the request REQext1B, the request REQext1B overtakes the preceding request REQext4A. At the cycle CYC4, when the request REQextB is inputted to the P2 stage as the request REQext2B, the request REQext2B collides with the preceding request REQext4A. Therefore, the order judging section OJG judges that it is impossible to input the requests REQext1B and REQext2B.

Note that, at the cycle CYC4, when the request REQextB is inputted to the P3 stage as the request REQext3B, the request REQext3B does not overtake the preceding request REQext4A. Therefore, the order judging section OJG judges that it is possible to input the request REQextB to the P3 stage as the request REQext3B. Therefore, the order judging section OJG judges that it is also possible to input the request REQext4B, timing of transfer to the P1 stages of which is later than the transfer timing of the request REQext3B.

Although not illustrated in the figure, when the request REQextA is input as the request REQext1A, the request REQext1A is inputted to the P1 stage at the cycle CYC2 preceding the cycle CYC3 at which the request REQext2A is transferred to the P1 stage. Therefore, the order judging section OJG judges that it is possible to input the requests REQext1B, REQext2B, REQext3B, and REQext4B. When the request REQextA is input as the request REQext3A, the request REQext3A is transferred to the P1 stage at the cycle CYC4 next to the cycle CYC3 at which the request REQext2A is transferred to the P1 stage. Therefore, at the cycle CYC4, when the request REQextB is inputted to the P1 stage as the request REQext1B, the request REQext1B collides with the preceding request REQext3A. In this case, the order judging section OJG judges that it is impossible to input the request REQext1B and judges that it is possible to input the requests REQext2B, REQext3B, and REQext4B.

Figure 10:
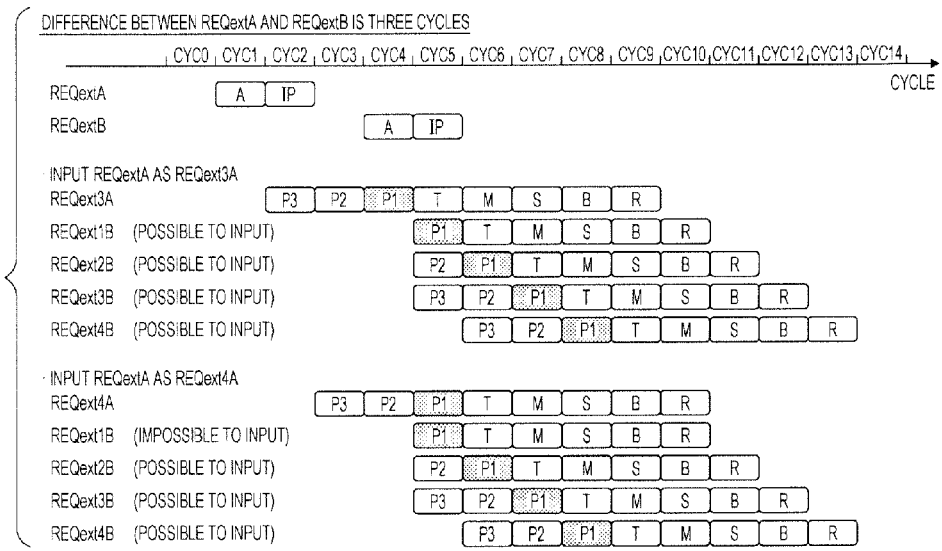
FIG. 10 is a diagram illustrating another example of the order judgment by the order judging section illustrated in FIG. 4.

FIG. 10 illustrates another example of the order judgment by the order judging section OJG illustrated in FIG. 4. Note that FIG. 10 illustrates an example of order judgment performed when a difference between issuance timings of the request REQextA and the request REQextB issued after the request REQextA is three cycles. In FIG. 10, as in FIG. 8, the P1 stage is indicated by hatching.

When the request REQextA is input as the request REQext3A, the request REQext3A is inputted to the P3 stage at the cycle CYC2 and transferred to the P1 stage at the cycle CYC4. In this case, at the cycle CYC5, even if the request REQextB is inputted to the P1 stage as the request REQext1B, the request REQext1B does not overtake the preceding request REQext3A. Therefore, the order judging section OJG judges that it is possible to input the request REQextB to the P1 stage as the request REQext1B. Therefore, the order judging section OJG judges that it is also possible to input the requests REQext2B, REQext3B, and REQext4B, timings of transfer to the P1 stages of which are later than the transfer timing of the request REQext1B.

When the request REQextA is input as the request REQext4A, the request REQext4A is inputted to the P3 stage at the cycle CYC3 and transferred to the P1 stage at the cycle CYC5. In this case, at the cycle CYC5, when the request REQextB is inputted to the P1 stage as the request REQext1B, the request REQext1B collides with the preceding request REQext4A. Therefore, the order judging section OJG judges that it is impossible to input the request REQext1B.

Note that, at the cycle CYC5, when the request REQextB is inputted to the P2 stage as the request REQext2B, the request REQext2B does not overtake the preceding request REQext4A. Therefore, the order judging section OJG judges that it is possible to input the request REQextB to the P2 stage as the request REQext2B. Therefore, the order judging section OJG judges that it is also possible to input the requests REQext3B and REQext4B, timings of transfer to the P1 stages of which are later than the transfer timing of the request REQext2B.

Although not illustrated in the figure, when the request REQextA is input as the request REQext2A, the request REQext2A is inputted to the P1 stage at the cycle CYC3 preceding the cycle CYC4 at which the request REQext3A is transferred to the P1 stage. Similarly, when the request REQextA is input as the request REQext1A, the request REQext1A is inputted to the P1 stage at the cycle CYC2 preceding the cycle CYC4 at which the request REQext3A is transferred to the P1 stage. Therefore, when the request REQextA is input as the request REQext1A or the request REQext2A, the order judging section OJG judges that it is possible to input the requests REQext1B, REQext2B, REQext3B, and REQext4B.

When a difference between issuance timings of the request REQextA and the request REQextB is four or more cycles, the request REQext1B is inputted to the P1 stage at the cycle CYC6 or subsequent cycles. Therefore, the request REQext1B does not overtake the preceding request REQext4A. Therefore, when the difference between the issuance timings of the request REQextA and the request REQextB is four or more cycles, irrespective of a stage to which the request REQextA is input, the order judging section OJG judges that it is possible to input the requests REQext1B, REQext2B, REQext3B, and REQext4B.

FIG. 11 illustrates an example of a judgment result by the order judging section OJG illustrated in FIG. 4. In the example illustrated in FIG. 11, the request REQextA is a request issued immediately preceding the request REQextB.

When the difference between the issuance timings of the request REQextA and the request REQextB is one cycle, it is possible to input the request REQext1B when the immediately preceding request REQextA is the request REQext1A. It is possible to input the request REQext2B when the immediately preceding request REQextA is the request REQext1A or the request REQext2A. It is possible to input the request REQext3B when the immediately preceding request REQextA is any one of the request REQext1A, REQext2A, and REQext3A. It is possible to input the request REQext4B irrespective of the immediately preceding request REQextA.

When the difference between the issuance timings of the request REQextA and the request REQextB is two cycles, it is possible to input the request REQext1B when the immediately preceding request REQextA is the request REQext1A or the request REQext2A. It is possible to input the request REQext2B when the immediately preceding request REQextA is any one of the requests REQext1A, REQext2A, and REQext3A. It is possible to input the requests REQext3B and REQext4B irrespectively of the immediately preceding request REQextA.

When the difference between the issuance timings of the request REQextA and the request REQextB is two cycles, it is possible to input the request REQext1B when the immediately preceding request REQextA is any one of the requests REQext1A, REQext2A, and REQext3A. It is possible to input the requests REQext2B, REQext3B, and REQext4B irrespectively of the immediately preceding request REQextA.

When the difference between the issuance timings of the request REQextA and the request REQextB is four or more cycles, it is possible to input the requests REQext1B, REQext2B, REQext3B, and REQext4B irrespectively of the immediately preceding request REQextA.

FIG. 12 illustrates an example of a judgment result by the collision judging section CJG illustrated in FIG. 4. When the request REQ is present in the P4 stage, it is impossible to input the request REQext4. When the request REQ is present in the P3 stage, it is impossible to input the request REQext3. When the request REQ is present in the P2 stage, it is impossible to input the request REQext 2. When the request REQ is present in the P1 stage, it is impossible to input the request REQext1.

In other words, when the request REQ is absent in the P4 stage, it is possible to input the request REQext4. When the request REQ is absent in the P3 stage, it is possible to input the request REQext3. When the request REQ is absent in the P2 stage, it is possible to input the request REQext2. When the request REQ is absent in the P1 stage, it is possible to input the request REQext1.

Figures 13, 14:
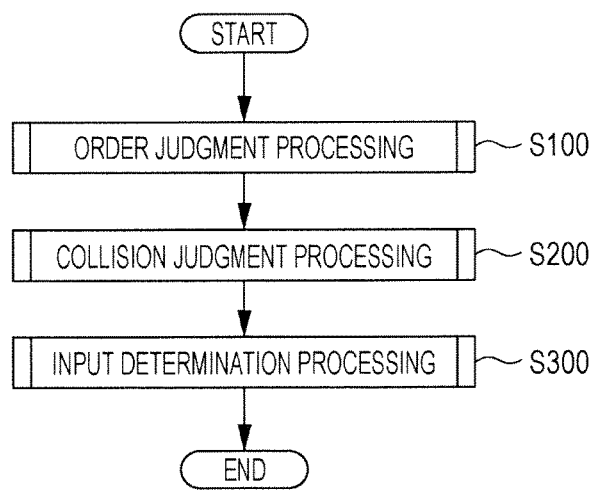
FIG. 13 is a diagram illustrating an example of a judgment result by an input determining section illustrated in FIG. 4.
FIG. 14 is a diagram illustrating an example of the operation of an instruction cache memory illustrated in FIG. 2.

FIG. 13 illustrates an example of a judgment result by the input determining section INDET illustrated in FIG. 4. A circle in FIG. 13 indicates the request REQext1 judged by both of the order judging section OJG and the collision judging section CJG as being able to be inputted. A cross in FIG. 13 indicates the request REQext1 judged by at least one of the order judging section OJG and the collision judging section CJG as being able to be inputted. A bar in FIG. 13 indicates that judgment results of the order judging section OJG and the collision judging section CJG may indicate that it is possible to or impossible to input the request REQext1.

When it is possible to input the request REQext1, the request REQext1 is inputted to the P1 stage. When it is impossible to input the request REQext1 and it is possible to input the request REQext2, the request REQext2 is inputted to the P2 stage. When it is impossible to input the requests REQext1 and REQext2 and it is possible to input the request REQext3, the request REQext3 is inputted to the P3 stage. When it is impossible to input the requests REQext1, REQext2, and REQext3 and it is possible to input the request REQext4, the request REQext4 is inputted to the P4 stage. When it is impossible to input the requests REQext1, REQext2, REQext3, and REQext4, the external request REQext is inputted to the P2 stage as the internal request REQintRP.

In this way, the request REQext is inputted to the selection stage P closest to the processing stage TMSBR among the selection stages P in which collision with the already-inputted request REQ is avoided and processing order of the processing stage TMSBR is reception order of the request REQext.

FIG. 14 illustrates an example of the operation of the instruction cache memory ICMb illustrated in FIG. 2.

Figure 15:
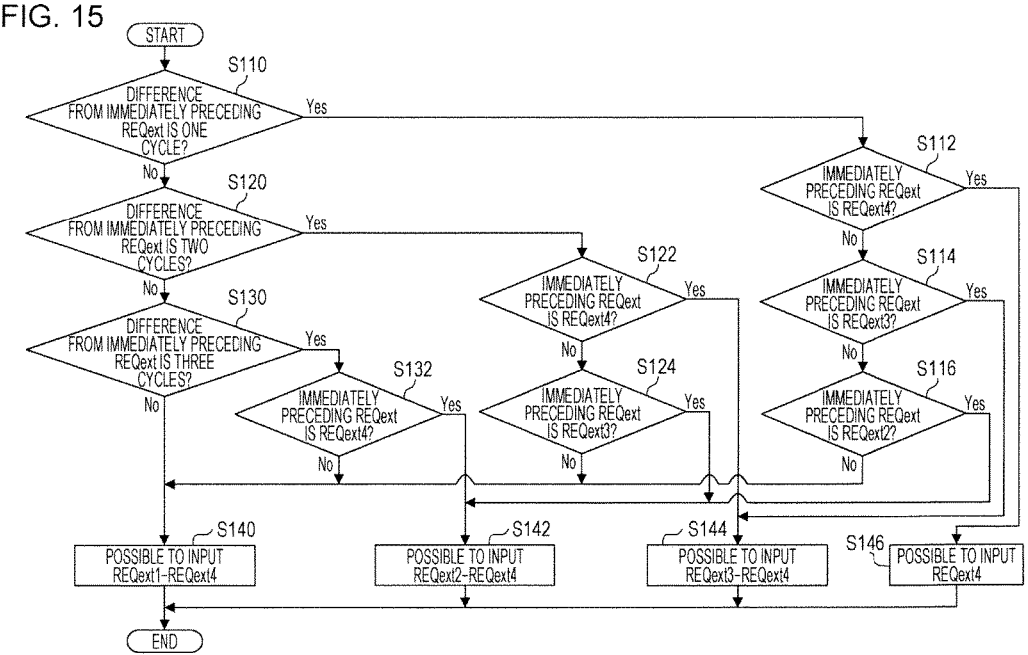
FIG. 15 is a diagram illustrating an example of the operation of the order judging section illustrated in FIG. 4.

In step S100, the order judging section OJG of the instruction cache memory ICMb executes order judgment processing illustrated in FIG. 15. Consequently, the judgment result illustrated in FIG. 11 is obtained.

Subsequently, in step S200, the collision judging section CJG of the instruction cache memory ICMb executes collision judgment processing illustrated in FIG. 16. Consequently, the judgment result illustrated in FIG. 12 is obtained.

Subsequently, in step S300, the input determining section INDET of the instruction cache memory ICMb executes input determination processing illustrated in FIG. 17. For example, as explained with reference to FIG. 13, the input determining section INDET determines, based on the judgment result (for example, FIG. 11) obtained by the order judgment processing in step S100 and the judgment result (for example, FIG. 12) obtained by the collision judgment processing in step S200, the request REQext to be inputted.

Note that the operation of the instruction cache memory ICMb is not limited to the example illustrated in FIG. 14. For example, step S100 may be executed after step S200 or may be executed in parallel to step S200.

FIG. 15 illustrates an example of the operation of the order judging section OJG illustrated in FIG. 4. That is, FIG. 15 illustrates an example of the order judgment processing S100 illustrated in FIG. 14. Note that the operation of the order judging section OJG is not limited to the example illustrated in FIG. 15. The "immediately preceding request REQext" illustrated in FIG. 15 is a request issued immediately before the judgment target, that is, input target request REQext.

In step S110, the order judging section OJG judges whether a difference between issuance timings of the judgment target request REQext and the immediately preceding request REQext is one cycle. When the difference between the issuance timings of the judgment target request REQext and the immediately preceding request REQext is one cycle, the operation of the order judging section OJG shifts to step S112. On the other hand, when the difference between the issuance timings of the judgment target request REQext and the immediately preceding request REQext is not one cycle, the operation of the order judging section OJG shifts to step S120.

In step S112, the order judging section OJG judges whether the immediately preceding request REQext is input as the request REQext4. When the immediately preceding request REQext is input as the request REQext4, the operation of the order judging section OJG shifts to step S146. On the other hand, when the immediately preceding request REQext is not input as the request REQext4, the operation of the order judging section OJG shifts to step S114.

In step S114, the order judging section OJG judges whether the immediately preceding request REQext is input as the request REQext3. When the immediately preceding request REQext is input as the request REQext3, the operation of the order judging section OJG shifts to step S144. On the other hand, when the immediately preceding request REQext is not input as the request REQext3, the operation of the order judging section OJG shifts to step S116.

In step S116, the order judging section OJG judges whether the immediately preceding request REQext is input as the request REQext2. When the immediately preceding request REQext is input as the request REQext2, the operation of the order judging section OJG shifts to step S142. On the other hand, when the immediately preceding request REQext is not input as the request REQext2, the operation of the order judging section OJG shifts to step S140.

In step S120, the order judging section OJG judges whether the difference between issuance timings of the judgment target request REQext and the immediately preceding request REQext is two cycles. When the difference between the issuance timings of the judgment target request REQext and the immediately preceding request REQext is two cycles, the operation of the order judging section OJG shifts to step S122. On the other hand, when the difference between the issuance timings of the judgment target request REQext and the immediately preceding request REQext is not two cycles, the operation of the order judging section OJG shifts to step S130.

In step S122, the order judging section OJG judges whether the immediately preceding request REQext is input as the request REQext4. When the immediately preceding request REQext is input as the request REQext4, the operation of the order judging section OJG shifts to step S144. On the other hand, when the immediately preceding request REQext is not input as the request REQext4, the operation of the order judging section OJG shifts to step S124.

In step S124, the order judging section OJG judges whether the immediately preceding request REQext is input as the request REQext3. When the immediately preceding request REQext is input as the request REQext3, the operation of the order judging section OJG shifts to step S142. On the other hand, when the immediately preceding request REQext is not input as the request REQext3, the operation of the order judging section OJG shifts to step S140.

In step S130, the order judging section OJG judges whether the difference between issuance timings of the judgment target request REQext and the immediately preceding request REQext is three cycles. When the difference between the issuance timings of the judgment target request REQext and the immediately preceding request REQext is three cycles, the operation of the order judging section OJG shifts to step S132. On the other hand, when the difference between the issuance timings of the judgment target request REQext and the immediately preceding request REQext is not three cycles, the operation of the order judging section OJG shifts to step S140.

In step S132, the order judging section OJG judges whether the immediately preceding request REQext is input as the request REQext4. When the immediately preceding request REQext is input as the request REQext4, the operation of the order judging section OJG shifts to step S142. On the other hand, when the immediately preceding request REQext is not input as the request REQext4, the operation of the order judging section OJG shifts to step S140.

In step S140, the order judging section OJG judges that it is possible to input the judgment target request REQext as all of the requests REQext1, REQext2, REQext3, and REQext4 and ends the order judgment processing. For example, after the processing in step S140 is executed, the operation of the instruction cache memory ICMb shifts to step S200 illustrated in FIG. 14.

In step S142, the order judging section OJG determines that it is possible to input the judgment target request REQext as any one of the requests REQext2, REQext3, and REQext4 and ends the order judgment processing. For example, after the processing in step S142 is executed, the operation of the instruction cache memory ICMb shifts to step S200 illustrated in FIG. 14.

In step S144, the order judging section OJG judges that it is possible to input the judgment target request REQext as one of the requests REQext3 and REQext4 and ends the order judgment processing. For example, after the processing in step S144 is executed, the operation of the instruction cache memory ICMb shifts to step S200 illustrated in FIG. 14.

In step S146, the order judging section OJG judges that it is possible to input the judgment target request REQext as the request REQext4 and ends the order judgment processing. For example, after the processing in step S146 is executed, the operation of the instruction cache memory ICMb shifts to step S200 illustrated in FIG. 14.

Figure 16:
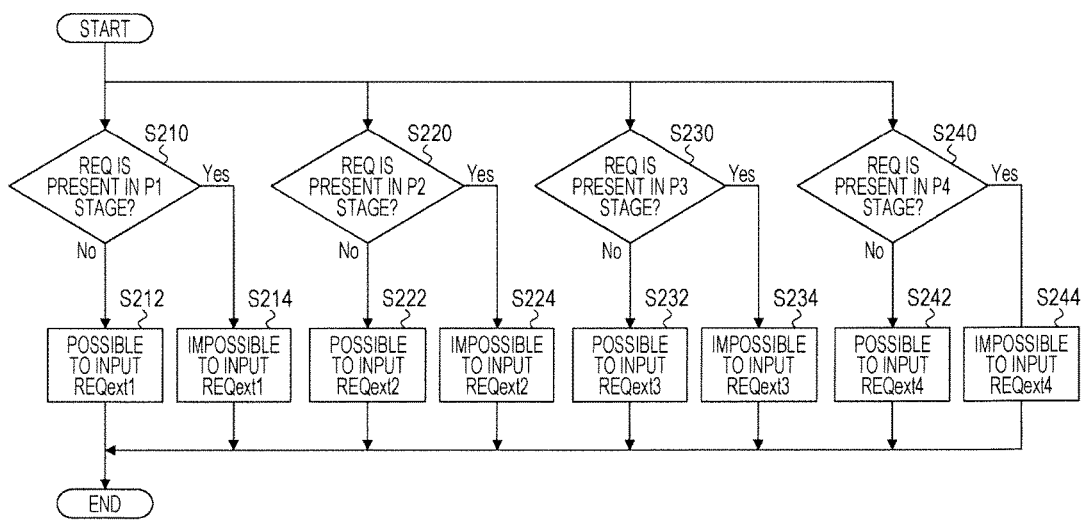
FIG. 16 is a diagram illustrating an example of the operation of the collision judging section illustrated in FIG. 4.

FIG. 16 illustrates an example of the operation of the collision judging section CJG illustrated in FIG. 4. That is, FIG. 16 illustrates an example of the collision judgment processing S200 illustrated in FIG. 14. In the example illustrated in FIG. 16, a flow of steps S210, S212, and S214, a flow of steps S220, S222, and S224, a flow of steps S230, S232, and S234, and a flow of steps S240, S242, and S244 are executed in parallel. Note that the flow of steps S210, S212, and S214, the flow of steps S220, S222, and S224, the flow of steps S230, S232, and S234, and the flow of steps S240, S242, and S244 may be sequentially executed.

In step S210, the collision judging section CJG judges whether the request REQ is present in the P1 stage. When the request REQ is present in the P1 stage, in step S214, the collision judging section CJG judges that it is impossible to input the judgment target request REQext as the request REQext1. On the other hand, when the request REQ is absent in the P1 stage, in step S212, the collision judging section CJG judges that it is possible to input the judgment target request REQext to the P1 stage as the request REQext1.

In step S220, the collision judging section CJG judges whether the request REQ is present in the P2 stage. When the request REQ is present in the P2 stage, in step S224, the collision judging section CJG judges that it is impossible to input the judgment target request REQext as the request REQext2. On the other hand, when the request REQ is absent in the P2 stage, in step S222, the collision judging section CJG judges that it is possible to input the judgment target request REQext to the P2 stage as the request REQext2.

In step S230, the collision judging section CJG judges whether the request REQ is present in the P3 stage. When the request REQ is present in the P3 stage, in step S234, the collision judging section CJG judges that it is impossible to input the judgment target request REQext as the request REQext3. On the other hand, when the request REQ is absent in the P3 stage, in step S232, the collision judging section CJG judges that it is possible to input the judgment target request REQext to the P3 stage as the request REQext3.

In step S240, the collision judging section CJG judges whether the request REQ is present in the P4 stage. When the request REQ is present in the P4 stage, in step S244, the collision judging section CJG judges that it is impossible to input the judgment target request REQext as the request REQext4. On the other hand, when the request REQ is absent in the P4 stage, in step S242, the collision judging section CJG judges that it is possible to input the judgment target request REQext to the P4 stage as the request REQext4.

After the collision judgment processing illustrated in FIG. 16 ends, the operation of the instruction cache memory ICMb shifts to step S300 illustrated in FIG. 14. Note that the operation of the collision judging section CJG is not limited to the example illustrated in FIG. 16.

Figure 17:
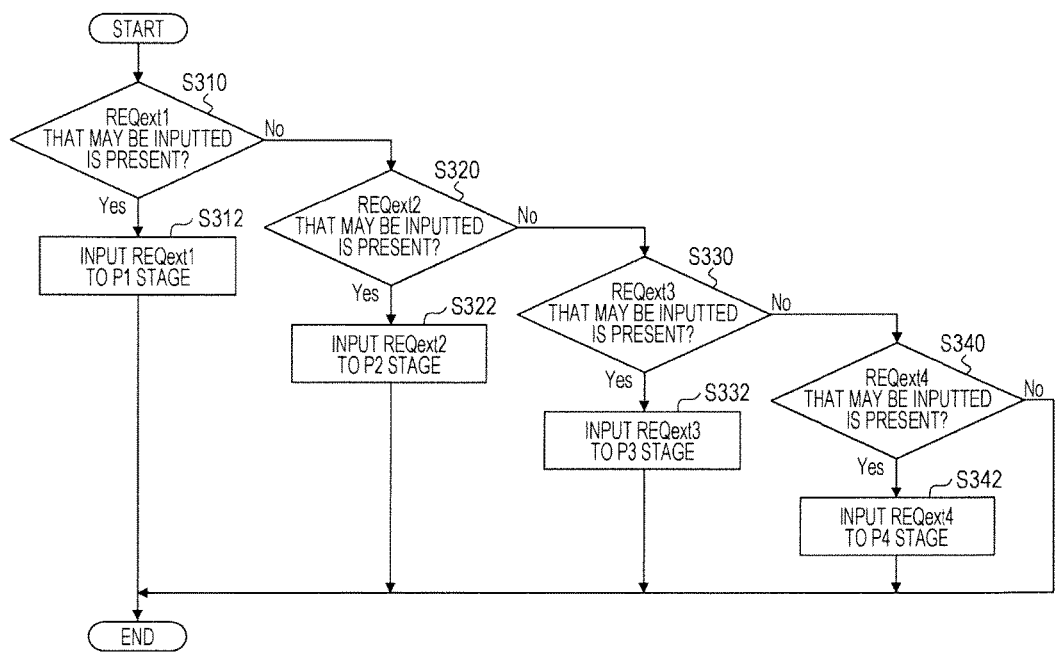
FIG. 17 is a diagram illustrating an example of the operation of the input determining section illustrated in FIG. 4.

FIG. 17 illustrates an example of the operation of the input determining section INDET illustrated in FIG. 4. That is, FIG. 17 illustrates an example of the input determination processing S300 illustrated in FIG. 14. Note that the operation of the input determining section INDET is not limited to the example illustrated in FIG. 17.

In step S310, the input determining section INDET determines whether the request REQext that is able to be inputted is present. For example, when both of the order judging section OJG and the collision judging section CJG judge that it is possible to input the input target request REQext to the P1 stage as the request REQext1, the input determining section INDET determines that the request REQext1 that is able to be inputted is present. When the request REQext1 that is able to be inputted is present, the operation of the input determining section INDET shifts to step S312. On the other hand, when the request REQext1 that is able to be inputted is absent, the operation of the input determining section INDET shifts to step S320.

In step S312, the input determining section INDET inputs the request REQext to the P1 stage as the request REQext1 and ends the input determination processing. For example, the input determining section INDET controls the selector SP1 of the pipeline processing section PLPb and inputs the request REQext received from the instruction control section IU to the P1 stage as the request REQext1.

In step S320, the input determining section INDET determines whether the request REQext2 that is able to be inputted is present. For example, when both of the order judging section OJG and the collision judging section CJG judge that it is possible to input the input target request REQext to the P2 stage as the request REQext2, the input determining section INDET determines that the request REQext2 that is able to be inputted is present. When the request REQext2 that is able to be inputted is present, the operation of the input determining section INDET shifts to step S322. On the other hand, when the request REQext2 that is able to be inputted is absent, the operation of the input determining section INDET shifts to step S330.

In step S322, the input determining section INDET inputs the request REQext to the P2 stage as the request REQext2 and ends the input determination processing. For example, the input determining section INDET controls the selector SP2 of the pipeline processing section PLPb and inputs the request REQext received from the instruction control section IU to the P2 stage as the request REQext2.

In step S330, the input determining section INDET determines whether the request REQext3 that is able to be inputted is present. For example, when both of the order judging section OJG and the collision judging section CJG judge that it is possible to input the input target request REQext to the P3 stage as the request REQext3, the input determining section INDET determines that the request REQext3 that is able to be inputted is present. When the request REQext3 that is able to be inputted is present, the operation of the input determining section INDET shifts to step S332. On the other hand, when the request REQext3 that is able to be inputted is absent, the operation of the input determining section INDET shifts to step S340.

In step S332, the input determining section INDET inputs the request REQext to the P3 stage as the request REQext3 and ends the input determination processing. For example, the input determining section INDET controls the selector SP3 of the pipeline processing section PLPb and inputs the request REQext received from the instruction control section IU to the P3 stage as the request REQext3.

In step S340, the input determining section INDET determines whether the request REQext4 that is able to be inputted is present. For example, when both of the order judging section OJG and the collision judging section CJG judge that it is possible to input the input target request REQext to the P4 stage as the request REQext4, the input determining section INDET determines that the request REQext4 that is able to be inputted is present. When the request REQext4 that is able to be inputted is present, the operation of the input determining section INDET shifts to step S342. On the other hand, when the request REQext4 that is able to be inputted is absent, the input determination processing ends.

In step S342, the input determining section INDET inputs the request REQext to the P4 stage as the request REQext4 and ends the input determination processing. For example, the input determining section INDET controls the selector SP4 of the pipeline processing section PLPb and inputs the request REQext received from the instruction control section IU to the P4 stage as the request REQext4.

In this way, the input determining section INDET controls the selectors SP1 to SP4 and inputs the request REQext to the selection state P closest to the processing stage T among the selection stages P to which the request REQext received from the instruction control section IU is able to be inputted.

In the embodiment illustrated in FIGS. 2 to 17, an effect same as the effect of the embodiment illustrated in FIGS. 1A and 1B is obtained. For example, the instruction-cache control section ICMCb specifies the selection stages P in which collision of the request REQext received from the instruction control section IU and the already-inputted request REQ is avoided and processing order of the processing stage TMSBR is reception order of the request REQext. The instruction-cache control section ICMCb inputs the request REQext received from the instruction control section IU to the selection stage P closest to the processing stage TMSBR among the specified selection stages P. Consequently, it is possible to suppress an increase in latency of the instruction cache memory ICMb compared with when the request REQext received from the instruction control section IU is inputted to only a predetermined stage among the selection stages P3, P2, and P1.

In the embodiments, the primary cache memory, the secondary cache memory, the data cache memory, and the instruction cache memory may be configured by static RAMs. The instruction control section, the instruction-cache control section, the instruction executing section, the pipeline processing section, the collision judging section, the order judging section, the input determining section, and the delay section may be configured as circuits. Feature points and advantages of the embodiments are clarified by the above detained explanation. This intends to extend the scope of claims to the feature points and the advantages of the embodiments without departing from the spirit of claims. Those having ordinary knowledge in the technical field may be able to easily conceive all improvements and changes. Therefore, the scope of the embodiments having inventiveness is not intended to be limited to the scope explained above and may depend on appropriate improvements and equivalents included in the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An apparatus comprising:
a cache configured to retain an instruction;
an instruction-control circuit configured to read out the instruction from the cache; and
an instruction-execution circuit configured to execute the instruction read out from the cache, wherein
the cache includes:
  a pipeline processing circuit including a plurality of selection stages in each of which, among a plurality of requests for causing the cache to operate, a request having a priority level higher than priority levels of other requests is outputted to a next stage and a plurality of processing stages in each of which processing based on a request outputted from a last stage among the plurality of selection stages is sequentially executed; and
  a cache-control circuit configured to input a request received from the instruction-control circuit to the selection stage in which a processing order of the processing stage is a reception order of the received request,
wherein the cache-control circuit includes:
  a collision-judgment circuit configured to specify the selection stages in each of which collision of an external request, which is the request received from the instruction-control circuit, and an already-inputted request is avoided;

an order-judgment circuit configured to specify the selection stages in each of which processing order of the processing stage of the external request is reception order of the external request; and an input determination circuit configured to input the external request to the selection stage closest to the processing stage among the selection stages specified by both of the order-judgment circuit and the collision-judgment circuit.

2. The apparatus according to claim 1, wherein
the plurality of selection stages include a first selection stage, which is a last stage among the plurality of selection stages, a second selection stage, which is the selection stage for preceding the first selection stage, and a third selection stage, which is the selection stage for preceding the second selection stage, and
the collision-judgment circuit includes:
  a third OR circuit configured to calculate OR of information indicating that an internal request, which is a request generated in the cache, is inputted to the third selection stage and information indicating that an already-inputted external request is transferred to the third selection stage and output a calculation result to the input determination circuit as third collision information indicating that a request is present in the third selection stage;
  a second OR circuit configured to calculate OR of information indicating that an external request is inputted to the third selection stage and the third collision information;
  a second delay circuit configured to receive, from the second OR circuit, information for indicating a calculation result of the OR of the information for indicating that the external request is inputted to the third selection stage and the third collision information and output the information received from the second OR circuit as second collision information with a delay of one stage;
  a first OR circuit configured to calculate OR of information for indicating that the external request is inputted to the second selection stage and the second collision information; and
  a first delay circuit configured to receive, from the first OR circuit, information for indicating a calculation result of the OR of the information for indicating that the external request is inputted to the second selection stage and the second collision information and output the information received from the first OR circuit to the input determination circuit with a delay of one stage as first collision information for indicating that a request is present in the first selection stage.

3. A control method for an apparatus including a cache configured to retain an instruction, and an instruction-control circuit configured to read out the instruction from the cache, the method comprising:
  by a pipeline processing circuit included in the cache,
    outputting, in a plurality of selection stage, among a plurality of requests for causing the cache to operate, a request having a priority level higher than priority levels of other requests to a next stage, and
    sequentially executing, in a plurality of processing stages, processing based on a request outputted from a last stage among the plurality of selection stages, and
  by a cache-control circuit included in the cache,
    inputting a request received from the instruction-control circuit to the selection stage in which a processing order of the processing stage is a reception order of the received request,
  wherein the cache-control circuit includes:
    a collision-judgment circuit configured to specify the selection stages in each of which collision of an external request, which is the request received from the instruction-control circuit, and an already-inputted request is avoided;
    an order-judgment circuit configured to specify the selection stages in each of which processing order of the processing stage of the external request is reception order of the external request; and
    an input determination circuit configured to input the external request to the selection stage closest to the processing stage among the selection stages specified by both of the order-judgment circuit and the collision-judgment circuit.

* * * * *